United States Patent
Whitton et al.

(10) Patent No.: US 12,515,300 B2
(45) Date of Patent: Jan. 6, 2026

(54) FASTENING SYSTEM FOR SECURING A COMPONENT TO A MOUNTING DEVICE FOR A HIGH-TEMPERATURE PROCESS

(71) Applicant: Chromalloy Gas Turbine LLC, Palm Beach Gardens, FL (US)

(72) Inventors: James Whitton, East Burke, VT (US); Zachary Oras, Riverview, FL (US); Zachary Hopkins, San Diego, CA (US)

(73) Assignee: Chromalloy Gas Turbine LLC, Palm Beach Gardens, FL (US)

( * ) Notice: Subject to any disclaimer, the term of this patent is extended or adjusted under 35 U.S.C. 154(b) by 248 days.

(21) Appl. No.: 18/298,703

(22) Filed: Apr. 11, 2023

(65) Prior Publication Data

US 2024/0342866 A1    Oct. 17, 2024

(51) Int. Cl.
| | |
|---|---|
| *B25B 11/00* | (2006.01) |
| *F16B 5/06* | (2006.01) |
| *F16B 21/06* | (2006.01) |
| *F16B 21/07* | (2006.01) |

(52) U.S. Cl.
CPC ............ *B25B 11/00* (2013.01); *F16B 5/0642* (2013.01); *F16B 5/065* (2013.01); *F16B 21/06* (2013.01); *F16B 21/07* (2013.01)

(58) Field of Classification Search
CPC ............... F16B 21/06; Y10T 292/0894; Y10T 292/0902; Y10T 292/0907
See application file for complete search history.

(56) References Cited

U.S. PATENT DOCUMENTS

| | | | | |
|---|---|---|---|---|
| 2,111,267 A | * | 3/1938 | Hoppenstand | .......... F16B 21/06 411/338 |
| 3,417,438 A | * | 12/1968 | Schuplin | ................ F16B 21/06 411/41 |

(Continued)

FOREIGN PATENT DOCUMENTS

| | | | | |
|---|---|---|---|---|
| CA | 2197746 C | * | 1/2000 | .......... F16B 19/1081 |
| EP | 2371459 A2 | | 10/2011 | |

(Continued)

OTHER PUBLICATIONS

English Machine Translation of CA-2197746-C (Year: 2000).*
Extended European Search Report, dated Aug. 12, 2024, 8 pages, issued in European Application No. 24168950.4.

*Primary Examiner* — Sarang Afzali
(74) *Attorney, Agent, or Firm* — AVEK IP, LLC

(57) ABSTRACT

A fastening system for securing a mounting tool configured to retain a component that is to undergo a high-temperature process. The mounting tool has a first portion having a first tab with a first slot and a second portion having a second tab with a second slot. The fastening system comprises an outer clip including outer clip arms and a central portion. The outer clip arms have a gap therebetween. The central portion protrudes into the gap. The fastening system includes an inner clip including inner clip arms. The inner clip is pushed into the gap such that each inner clip arm contacts and pushes one outer clip arm towards the first tab and the second tab. When the fastening system is inserted into the first slot and the second slot, the fastening system limits relative movement between the first tab and the second tab.

20 Claims, 32 Drawing Sheets

(56) References Cited

U.S. PATENT DOCUMENTS

| | | | | |
|---|---|---|---|---|
| 3,659,320 | A | * | 5/1972 | Meyer ................ F16B 19/1081 411/908 |
| 5,201,623 | A | * | 4/1993 | Benedetti ............ F16B 19/1081 411/48 |
| 5,775,860 | A | * | 7/1998 | Meyer ................ F16B 19/1081 411/41 |
| 7,243,401 | B2 | * | 7/2007 | Sawatani ............ F16B 19/1081 24/297 |
| 2010/0172714 | A1 | | 7/2010 | Sano |

FOREIGN PATENT DOCUMENTS

| | | |
|---|---|---|
| EP | 2722534 A1 | 4/2014 |
| EP | 4446598 A1 | 10/2024 |
| GB | 2461111 A | 12/2009 |

* cited by examiner

FIG. 1 – PRIOR ART

FASTENING SYSTEM FOR SECURING A COMPONENT TO A MOUNTING DEVICE FOR A HIGH-TEMPERATURE PROCESS

FIELD OF DISCLOSURE

The disclosure relates generally to the retention of components during a high-temperature process. More specifically, the disclosure relates to interlocking clips configured for securing a component within a mounting device while the component undergoes a high-temperature process.

BRIEF SUMMARY OF DISCLOSURE

The following presents a simplified summary of the disclosure in order to provide a basic understanding of some aspects of the disclosure. This summary is not an ex-tensive overview of the disclosure. It is not intended to identify critical elements of the disclosure or to delineate the scope of the disclosure. Its sole purpose is to present some concepts of the disclosure in a simplified form as a prelude to the more detailed description that is presented elsewhere.

In an aspect, a fastening system for securing a mounting tool configured to retain a component that is to undergo a high-temperature process is disclosed. The mounting tool has a first portion and a second portion. The first portion includes a first tab with a first slot and the second portion includes a second tab with a second slot. The first tab and the second tab are usable to secure the first portion to the second portion while the component is retained within the mounting tool. The fastening system comprises an outer clip including outer clip arms and a central portion. The outer clip arms have a gap therebetween. The central portion protrudes into the gap. The fastening system includes an inner clip including inner clip arms. The inner clip is configured to be pushed into the gap such that each inner clip arm contacts and pushes one outer clip arm towards the first tab and the second tab while the outer clip is retained within the first slot and the second slot. When the fastening system is inserted into the first slot and the second slot, the fastening system limits relative movement between the first tab and the second tab.

In some aspects, according to any one of the preceding aspects, the techniques described herein relate to a fastening system, wherein the outer clip arms include a first outer clip arm and a second outer clip arm, each of the first outer clip arm and the second outer clip arm including a bowed section.

In some aspects, according to any one of the preceding aspects, the techniques described herein relate to a fastening system, wherein the bowed section of the first outer clip arm curves in a first direction and the bowed section of the second outer clip arm curves in a second direction, the second direction being opposite the first direction.

In some aspects, according to any one of the preceding aspects, the techniques described herein relate to a fastening system, wherein the inner clip arms includes a first inner clip arm and a second inner clip arm, the first inner clip arm including a bowed portion corresponding to the bowed section of the first outer clip arm.

In some aspects, according to any one of the preceding aspects, the techniques described herein relate to a fastening system, wherein the first outer clip arm contacts one end of each of the first slot and the second slot and the second outer clip arm contacts an opposing end of each of the first slot and the second slot.

In some aspects, according to any one of the preceding aspects, the techniques described herein relate to a fastening system, wherein: each of the outer clip arms has an inner surface and an outer surface; and each inner surface of each outer clip arm includes a recess.

In some aspects, according to any one of the preceding aspects, the techniques described herein relate to a fastening system, wherein the gap includes a central portion and two channels, each of the two channels configured to accept one of the inner clip arms.

In some aspects, according to any one of the preceding aspects, the techniques described herein relate to a fastening system, wherein each of the two channels includes a rounded end spaced apart from an associated inner clip arm.

In some aspects, according to any one of the preceding aspects, the techniques described herein relate to a fastening system, further including a window in at least one of the outer clip and the inner clip.

In some aspects, according to any one of the preceding aspects, the techniques described herein relate to a fastening system, wherein the fastening system is reusable.

In some aspects, according to any one of the preceding aspects, the techniques described herein relate to a fastening system, wherein each of the outer clip arms extends from a curved shoulder.

In some aspects, according to any one of the preceding aspects, the techniques described herein relate to a fastening system, wherein each of the outer clip arms expand during the high-temperature process in an outboard direction to push against the first tab and the second tab with an increased force relative to a force exerted by the outer clip arms in the outboard direction prior to the high-temperature process.

In some aspects, according to any one of the preceding aspects, the techniques described herein relate to a fastening system, wherein the component is an aviation component.

In some aspects, according to any one of the preceding aspects, the techniques described herein relate to a fastening system wherein the component is selected from the group consisting of a turbine blade, a turbine vane, a compressor blade, and a compressor vane.

In an aspect, a fastening system for securing a mounting device configured to retain a component while the component undergoes a high-temperature process is provided. The mounting device has a first portion having a first tab and a second portion having a second tab. The first tab has a first slot and the second tab has a second slot. The fastening system comprises an outer clip having a body with a first shoulder on a first side and a second shoulder on a second side, a first outer clip arm extending from the first shoulder, and a second outer clip arm extending from the second shoulder. The first outer clip arm and the second outer clip arm have a gap therebetween. The fastening system includes an inner clip having a body, a first inner clip arm, and a second inner clip arm. The inner clip is configured to be pushed into the gap such that the first inner clip arm is inwardly adjacent the first outer clip arm and the second inner clip arm is inwardly adjacent the second outer clip arm. When the inner clip is pushed into the gap, the first inner clip arm is configured to push the first outer clip arm towards a first end of each of the first slot and the second slot and the second inner clip arm is configured to push the second outer clip arm towards a second end of each of the first slot and the second slot.

In some aspects, according to any one of the preceding aspects, the techniques described herein relate to a fastening system, wherein the gap includes a central portion that extends into two channels, each of the two channels configured to receive one of the first inner clip arm and the second inner clip arm.

In an aspect, a method for fastening a mounting device configured to retain a component for a high-temperature process is disclosed. The mounting device has a first part including a first tab and a second part including a second tab. The first tab has a first slot and the second tab has a second slot. The method includes situating the component within a cavity of the mounting device and placing an outer clip within the first slot and the second slot. The method comprises pushing an inner clip within a gap of the outer clip such that the inner clip pushes the outer clip against each of a first end of the first slot, a second end of the first slot, a first end of the second slot, and a second end of the second slot.

In some aspects, according to any one of the preceding aspects, the techniques described herein relate to a method, further including disassociating the outer clip and the inner clip from the mounting device after completion of the high-temperature process.

In some aspects, according to any one of the preceding aspects, the techniques described herein relate to a method, wherein the outer clip has an outer clip arm and the inner clip has an inner clip arm, a length of the outer clip arm being greater than a length of the inner clip arm.

In some aspects, according to any one of the preceding aspects, the techniques described herein relate to a method, wherein the outer clip arm faces a first direction and the inner clip arm faces a second direction, the second direction being opposite the first direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

DETAILED DESCRIPTION OF THE DISCLOSURE

Components, such as airfoils of gas turbine blades and vanes including aviation gas turbine blades and vanes, are often coated with one or more protective coatings to improve their durability and effectiveness during operation. The airfoil of a component is typically coated while the component is held in place by a mounting system. The mounting system may be, e.g., a clamshell type mounting system that securely retains the component while the component is coated. The clamshell mounting system may also serve to mask portions of the component that are not intended to be coated. The protective coatings may be applied using thermal spraying, Electron Beam Physical Vapor Deposition (otherwise referred to herein as "EBPVD" or just "PVD"), and/or other suitable processes. The protective coatings may need to be applied at extremely high temperatures (e.g., 1065.6° C. (1950° F.) or higher).

Figure 1:
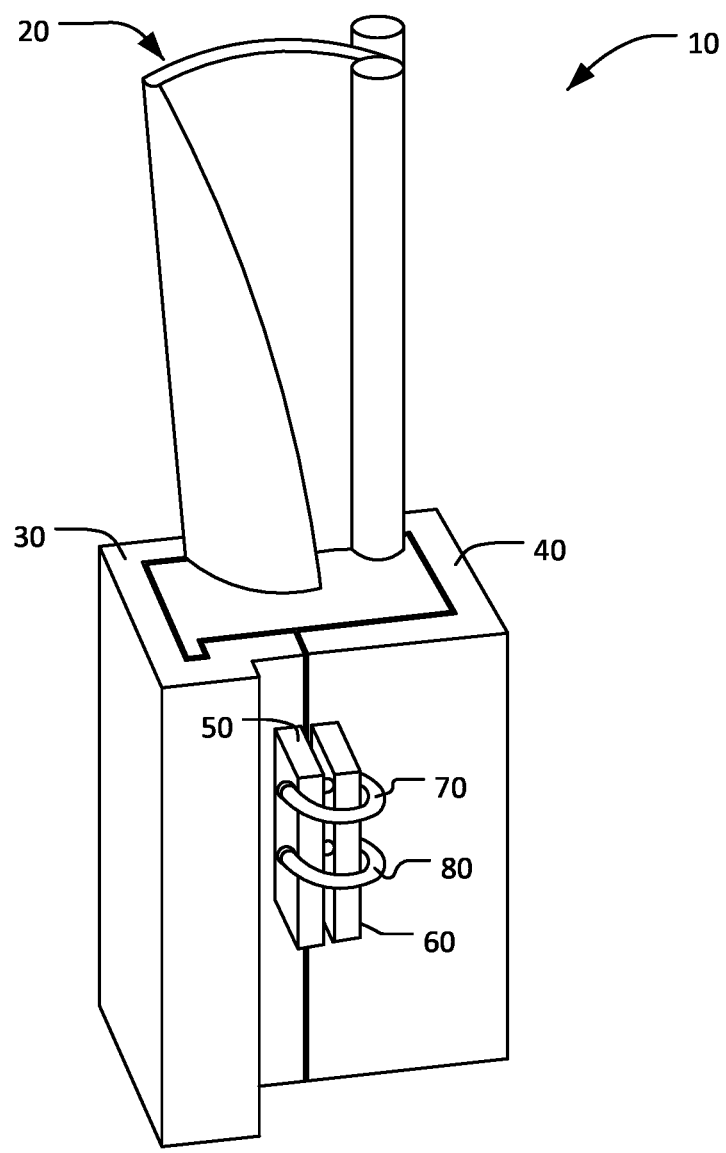
FIG. 1 is a perspective view of a PRIOR ART mounting system having wire ties for securing a component to a mounting device.

FIG. 1 depicts an example PRIOR ART clamshell mounting system 10 for securely retaining a component, such as but not limited to, a component 20 for coating (hereinafter "component 20" for ease of description only). The clamshell mounting system 10 has two clamshell halves 30 and 40 that securely retain the component 20 and cover portions of the component 20 that are not intended to be coated. The clamshell half 30 has a tab 50 and the clamshell half 40 has a tab 60. The tabs 50 and 60 may be fastened to each other to securely retain the component 20 within the mounting system 10. The tabs 50 and 60 of the mounting system 10 illustrated in FIG. 1 are fastened together using fasteners 70 and 80. Portions of the component 20, e.g., the airfoil thereof, are coated while the component 20 is secured within the mounting system 10 and the clamshell halves 30 and 40 are fastened to each other by the fasteners 70 and 80. After the coating process is complete, the fasteners 70 and 80 are removed to release the component 20 from the clamshell halves 30 and 40.

The fasteners 70 and 80 are chosen carefully. Not only must the fasteners 70 and 80 secure the clamshell halves 30 and 40 dependably, they must be able to withstand the potentially extremely high temperatures encountered during the coating process. If the fasteners 70 and/or 80 fail, the component 20 being coated may be displaced and incur damage. The component 20 may therefore have to be discarded and replaced. Such may be undesirable, as obtaining a replacement component may add unnecessary material, labor costs, and delays.

Aviation wire ties may be used as the fasteners 70 and 80 in high-temperature applications. The aviation wire ties may be twisted through apertures in the tabs 50 and 60 to secure the clamshell halves 30 and 40 together. Aviation wire ties, while usable to secure the component 20 within the mounting system 10 in some applications, are not optimal fasteners for all such high-temperature applications. The aviation wire ties may be laborious and time consuming to install correctly to secure the clamshell halves 30 and 40 together. The extreme temperatures may render the aviation wire ties unfit for subsequent use. Further, the thermal expansion and/or deformation of the aviation wire ties under the high temperatures encountered during the coating process may adversely affect their fastening efficacy. Every so often, one or more of the aviation wire ties may loosen during the high-temperature coating process, which may lead to a portion of the component 20 that is not intended to be coated to be unmasked and erroneously coated. In some cases, the aviation wire ties may fail entirely due to the extreme temperatures, freeing the component 20 from the clamshell halves 30 and 40. Such may permanently damage the component 20. Considering that the component 20 may be costly to replace (e.g., where the component 20 is an aviation component, it may cost upwards of tens of thousands of U.S. dollars in labor and material costs to replace), it may be important to ensure that the component 20 is securely fastened to the mounting system 10 during the coating process using a fastening system that can safely withstand the extreme temperatures encountered during the coating process. It may also be beneficial for the fastening system to be dependably reused.

Figure 2:
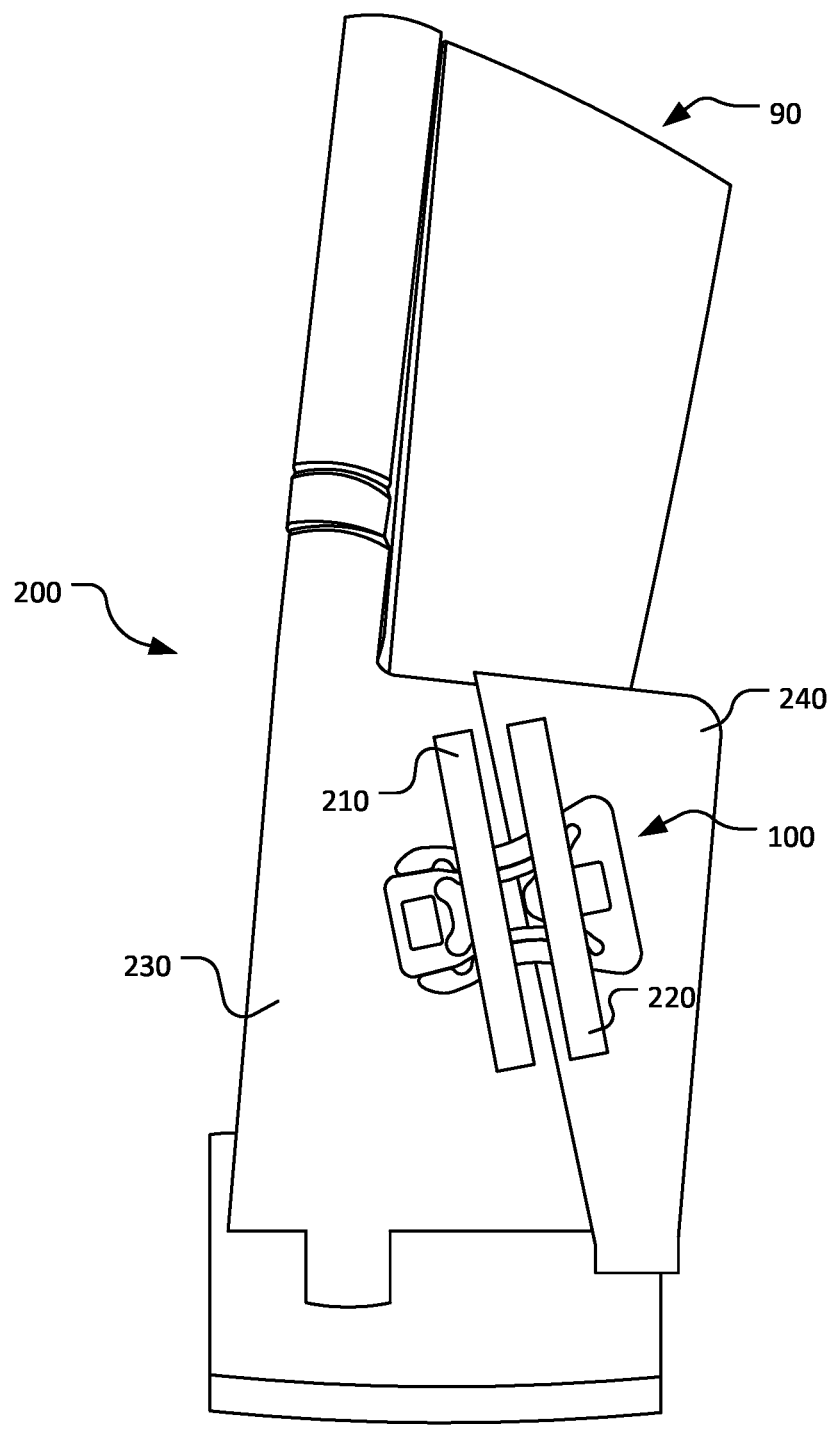
FIG. 2 is a side view of a mounting tool having a fastening system for securing a component to the mounting tool, according to an embodiment.

Focus is directed to FIG. 2, which depicts an embodiment of an interlocking fastening or clip system (hereinafter "fastening system 100" for ease of description only) for use with a mounting tool 200 for retaining (e.g., temporarily retaining) a component 90, such as but not limited to, a component 90 that is to undergo a high-temperature process. The component 90 may be an aviation component, such as an aviation airfoil, an aviation turbine blade, an aviation fan blade, an aviation turbine vane, an aviation compressor vane, or other suitable component or portion thereof that undergoes a high-temperature process prior to its intended use. Further, the component 90 may be a component for a land-based power genera-tion system or turbine, including but not limited to an airfoil, turbine blade, compressor or fan blade, turbine vane, compressor vane, or other suitable component or portion thereof that undergoes a high-temperature process prior to its intended use.

The phrase "high-temperature," as used herein, refers to a temperature of at least 260° C. (500° F.) or more. The high-temperature process may be a high-temperature coating process or any other process (e.g., a heat-treating process) during which the component 90 is secured to the mounting tool 200 and is subjected to a temperature of at least 260° C. (500° F.).

The mounting tool 200 may be any suitable tool configured to retain the component 90 undergoing the high-temperature process. In certain embodiments of the disclosure, the mounting tool 200 may comprise clamshell halves 230 and 240 (FIG. 2). The component 90 may be retained within the clamshell halves 230 and 240, and the clamshell halves 230 and 240 may be secured to each other to securely retain the component 90 during the high-temperature process. In embodiments where the high-temperature process is a coating process, the clamshell halves 230 and 240 may also be configured to cover or mask those portions of the component 90 that are not intended to be coated. The fastening system 100 may be used to fasten the clamshell halves 230 and 240 together to ensure the component 90 is securely retained within the mounting tool 200.

In an implementation, the fastening system 100 may comprise an outer clip 110 and an inner clip 150 which lock together (see FIG. 4) to secure the component 90 within the mounting tool 200 for a high-temperature process. In an example, the clamshell half 230 may have a tab 210 (see FIGS. 2 and 3) and the clamshell half 240 may have a tab 220 that are secured together by the fastening system 100. The tab 210 may comprise a slot (or opening) 215 defined by walls 217 and 219 (FIG. 3), and the tab 220 may comprise a slot (or opening) 225 defined by walls 227 and 229. As discussed herein, the fastening system 100, i.e., each of the outer clip 110 and the inner clip 150, may be passed through each of the slots 215 and 225 to temporarily secure the component 90 within the clamshell halves 230 and 240 of the mounting tool 200. The component 90 secured within the mounting tool 200 may then undergo a high-temperature process (e.g., the unmasked portion of the component 90 may be coated). Once the high-temperature process is completed, a user may extract the fastening system 100 from the slots 215 and 225 to release the clamshell halves 230 and 240 and liberate the component 90.

Figure 3:
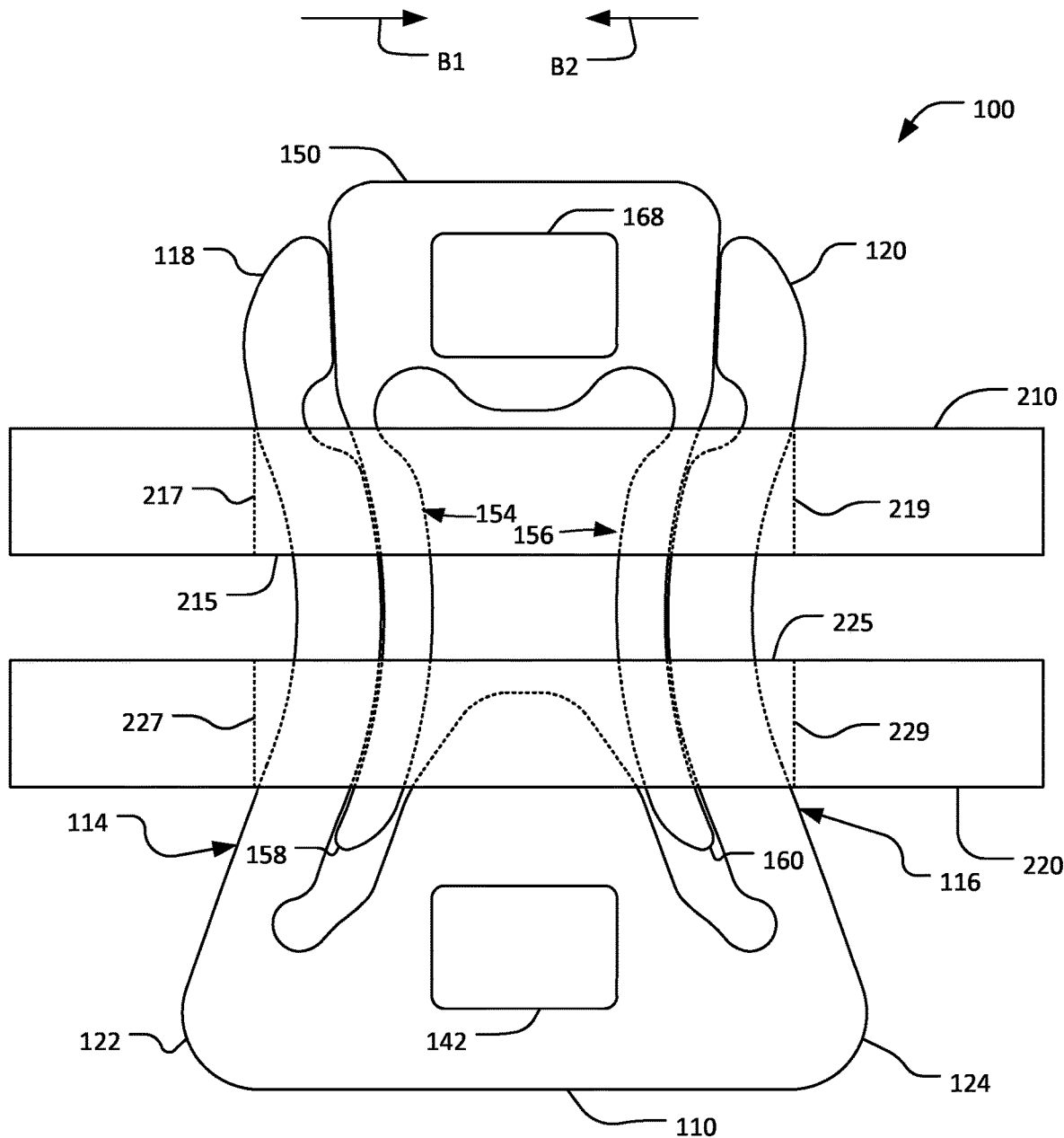
FIG. 3 is a schematic view of the fastening system arranged in slots of the mounting tool of FIG. 2.

Details of the interaction between the fastening system 100 and the slots 215 and 225 are depicted in FIG. 3. The outer clip 110 and the inner clip 150 of the fastening system 100 may be joined together to form a fastener which secures the tabs 210 and 220 together. More specifically, the outer clip 110 may be inserted into the slots 215 and 225 of the tabs 210 and 220 such that the outer clip 110 contacts the walls 217 and 219 of the tab 210 and walls 227 and 229 of the tab 220. The outer clip 110 may be configured to matingly accept the inner clip 150. The inner clip 150 may be received by the outer clip 110 therein and the inner clip 150 may push the outer clip 110 outwards against the walls 217 and 219 of the tab 210 and the walls 227 and 229 of the tab 220 as discussed herein.

The fastening system 100 may be selectively installed within the tabs 210 and 220 and removed therefrom. For installation, the outer clip 110 may first be placed within the slots 215 and 225, and then the inner clip 150 may be pushed inside the outer clip 110. In implementations, a tool, such as a vice grip, may be used to further push the outer clip 110 and the inner clip 150 towards the walls 217 and 219 of the tab 210 and the walls 227 and 229 of the tab 220 (e.g., by pushing the inner clip 150 further into the gap 138 of the outer clip 110) to cause the tabs 210 and 220 to be secured to each other such that there is minimal or no relative movement between the tabs 210 and 220. When the high-temperature process is complete, the outer clip 110 and the inner clip 150 may be disassociated from each other and the tabs 210 and 220 using, e.g., a pair of pliers or other tool. For instance, the outer clip 110 and the inner clip 150 may be collectively pulled out of the slots 215 and 225 and the outer clip 110 and the inner clip 150 may be disassociated from each other. In certain embodiments of the disclosure, this unlocking of the fastening system 100 may be non-destructive and the outer clip 110 and the inner clip 150 may be reused to subsequently lock the same or a different mounting tool. Such reusability may extend the life and use of the fastening system 100.

Figure 5:
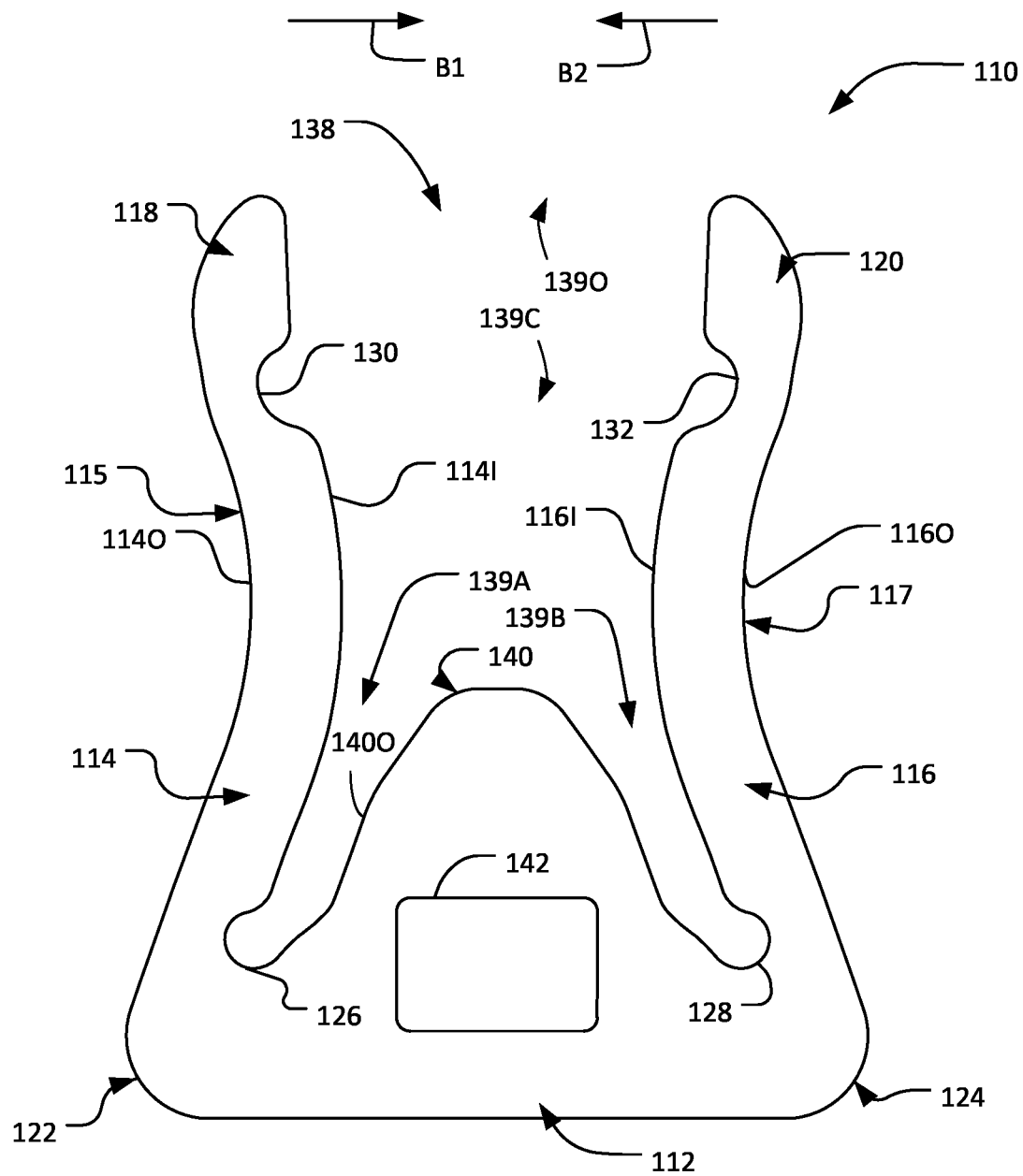
FIG. 5 is a top view of an outer clip of the fastening system of FIG. 2.

FIG. 5 shows the outer clip 110 in more detail. The outer clip 110 may comprise a body 112. The body 112 may have rounded shoulders 122 and 124 at opposing ends of the outer clip 110 and a head or central portion (hereinafter "central portion 140" for ease of description only). An arm 114 may extend from the shoulder 122 and an arm 116 may extend from the shoulder 124. The arms 114 and 116 and the central portion 140 may collectively define a gap 138.

The arm 114 may have an outer surface 114O and an inner surface 114I. The arm 116 may likewise have an outer surface 116O and an inner surface 116I. The inner surface 114I of the arm 114 may face the inner surface 116I of the arm 116. The outer surface 114O of the arm 114 and the outer surface 116O of the arm 116 may face away from each other.

In an implementation, the arm 114 may have a bowed section 115 and the arm 116 may have a bowed section 117. The bowed section 115 may be bowed or curved, and in certain embodiments of the disclosure, may be generally concave. The bowed section 117 may likewise be bowed or curved, and in certain embodiments of the disclosure, may be generally concave. Thus, as can be seen in FIG. 5, the bowed section 115, and specifically the inner surface 114I and the outer surface 114O of the arm 114 corresponding to the bowed section 115, curve inward in a direction B1. Similarly, the bowed section 117, and specifically the inner surface 116I and the outer surface 116O of the arm 116 corresponding to the bowed section 117, curve inward in a direction B2 that is opposite the direction B1.

The arm 114 may terminate at a terminal portion 118. The outer surface 114O of the arm 114 corresponding to the terminal portion 118 may be rounded or curved. An indentation or groove (hereinafter "groove 130" for ease of description only) may be provided on the inner surface 114I of the arm 114 at or proximate the terminal portion 118. In implementations, the arm 114, including the bowed section 117 and terminal portion 118 thereof, may be of unitary construction. In some implementations, the outer clip 110 may be of unitary construction.

The arm 116 may likewise terminate at a terminal portion 120. The outer surface 116O of the arm 116 corresponding to the terminal portion 120 may be rounded or curved. An indentation or groove (hereinafter "groove 132" for ease of description only) may be provided on the inner surface 116I of the arm 116 at or proximate the terminal portion 120. The groove 132 in the arm 116 may face the groove 130 in the arm 114.

The central portion 140 may be shorter in length than the arms 114 and 116 and may protrude between the arms 114 and 116. The central portion 140 may have an outer surface 140O that is curved. The inner surface 114I of the arm 114, the inner surface 116I of the arm 116, and the outer surface 140O of the central portion 140 may define the confines of the gap 138. The gap 138 may comprise a central gap portion 139C, and two channels 139A and 139B. The central gap portion 139C may extend between a part of the respective inner surfaces 114I and 116I of the arms 114 and 116. The central gap portion 139C may have an open end 139O on one side, and on the opposing side, may extend into the channels 139A and 139B. The channel 139A may be formed between the inner surface 114I of the arm 114 and the outer surface 140O of the central portion 140. The channel 139B may be formed between the inner surface 116I of the arm 116 and the outer surface 140O of the central portion 140. The channel 139A may terminate at a rounded recess 126 formed collectively by the inner surface 114I of the arm 114 and the outer surface 140O of the central portion 140. The channel 139B may terminate at a rounded recess 128 formed collectively by the inner surface 116I of the arm 116 and the outer surface 140O of the central portion 140. As discussed herein, various portions of the outer clip 110, such as the central gap portion 139C, channel 139A, and channel 139B, may be configured to receive corresponding portions of the inner clip 150.

In some implementations, the central portion 140 may have a window 142. The window 142 may be devoid of material and may allow the outer clip 110 to be grasped by a tool, such as a pair of pliers.

In implementations, the construction and structure of the outer clip 110, e.g., the arms 114 and 116 and the rounded recesses 126 and 128 of the outer clip 110, may allow for the outer clip 110 to have a degree of springiness or flexibility. Such may allow the arms 114 and 116 to be displaced from their original position, e.g., to cause the arms 114 and 116 to push against the walls 217 and 219 of the tab 210 and the walls 227 and 229 of the tab 220.

Figure 6:
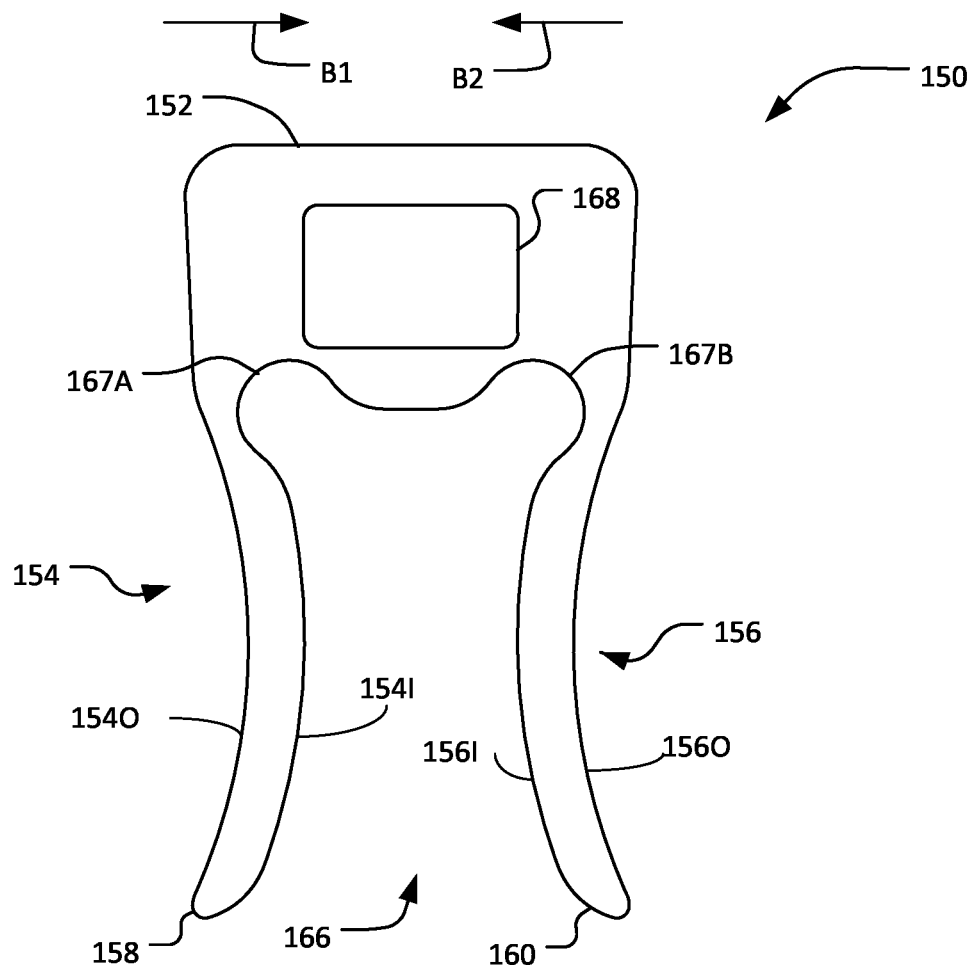
FIG. 6 is a top view of an inner clip of the fastening system of FIG. 2.

The inner clip 150 is shown in more detail in FIG. 6. The inner clip 150 may comprise a body 152 and arms 154 and 156 that each extend from the body 152. The arm 154 may have an outer surface 154O and an inner surface 154I that opposes the outer surface 154O. The arm 154 may terminate at a rounded terminal portion 158. The arm 156 may likewise have an outer surface 156O and an inner surface 156I that opposes the outer surface 156O. The arm 156 may terminate at a rounded terminal portion 160. In some examples, the arm 154 may be bowed. Specifically, the arm 154 may be generally concave or curve in the direction B1. The arm 156 may likewise be bowed and curve in the direction B2.

The inner surface 154I of arm 154 and the inner surface 156I of the arm 156 may face each other and have a gap or void (hereinafter "void 166") therebetween. The void 166 may include two rounded areas 167A and 167B. The construction of the inner clip 150, e.g., the presence of void 166 and the rounded areas 167A and 167B of the void 166, may impart a degree of springiness or elasticity to the arms 154 and 156 such that they may be displaced to mate with the outer clip 110. This spring tension may also serve to provide com-pressive force to the outer clip 110 to better hold the outer clip 110 within the slots 215 and 225. The body 152 of the inner clip 150 may, akin to the body 112 of the outer clip 110, have a window 168 that may be used to grab the inner clip 150, e.g., to disassociate the inner clip 150 from the outer clip 110 and the mounting tool 200.

Figure 4:
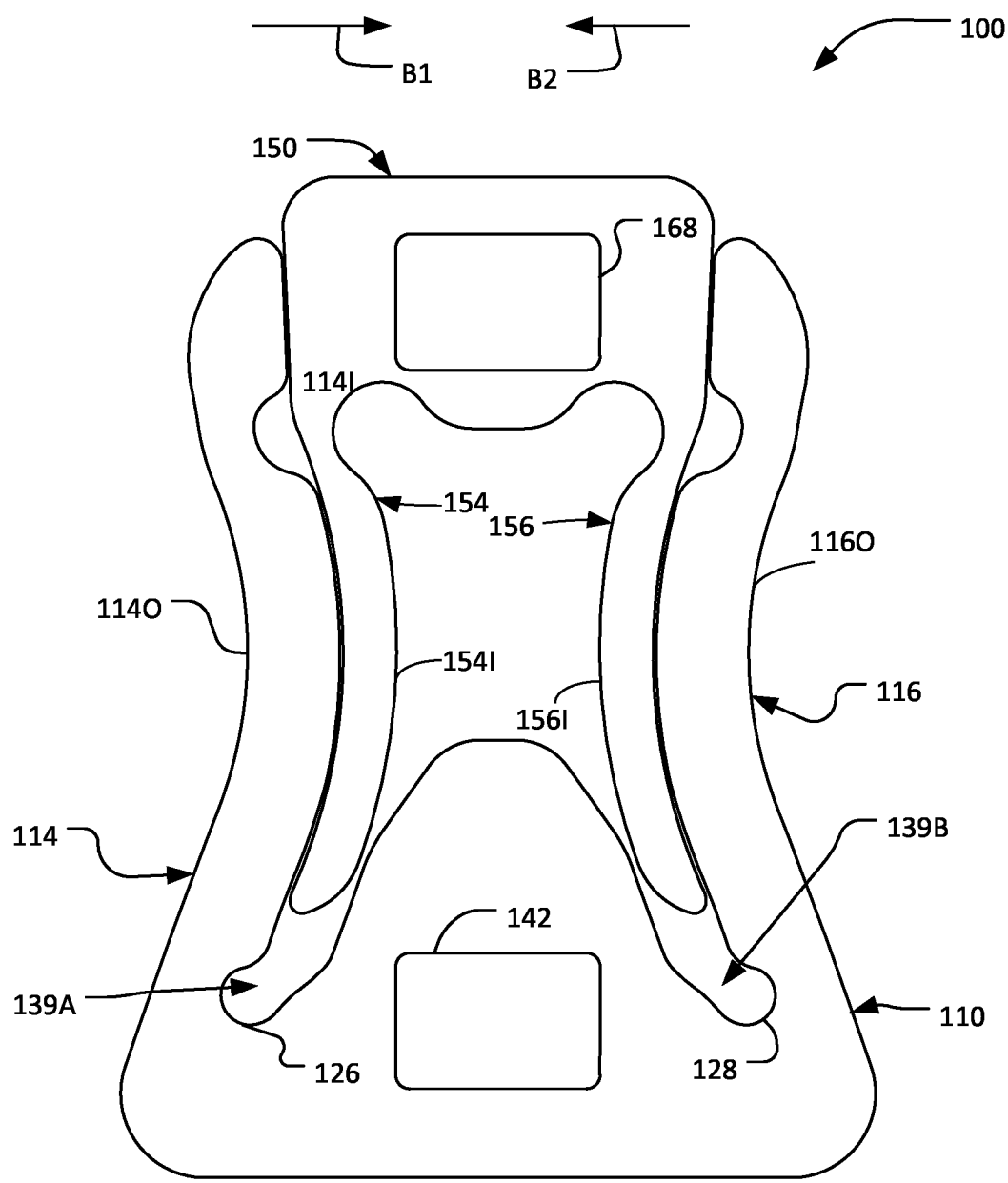
FIG. 4 is a top view of the fastening system of FIG. 2 in a locked configuration.

Focus is directed to FIG. 4, which illustrates the inner clip 150 matingly received within the outer clip 110. The arms 154 and 156 of the inner clip 150 may be pinched or pushed towards each other (e.g., the arm 154 may be pushed in direction B1 and the arm 156 may be pushed in direction B2) to allow the arms 154 and 156 to be received within the gap 138 (see FIG. 5) of the outer clip 110 via the open end 139O of the central gap portion 139C. The inner clip 150 may be pushed into the central gap portion 139C such that the arm 154 of the inner clip 150 enters the channel 139A of the gap 138 and the arm 156 of the inner clip 150 enters the channel 139B of the gap 138. When so configured, the outer surface 154O of the arm 154 of the inner clip 150 may contact the inner surface 114I of the arm 114 of the outer clip 110. Similarly, the outer surface 156O of the arm 156 of the inner clip 150 may contact the inner surface 116I of the arm 116 of the outer clip 110. Due to the springiness, the inner clip 150, e.g., the arms 154 and 156 thereof, may push the arms 114 and 116 of the outer clip 110 in an outward direction.

FIG. 3 shows the fastening system 100 secured within the tabs 210 and 220 of the mounting tool 200. The outer clip 110 may first be pushed into the slots 215 and 225 such that portions of the arms 114 and 116 of the outer clip 110, and specifically the outer surfaces 114O and 116O of the arms 114 and 116 corresponding to these portions, contact and push against the walls 217 and 219 associated with the slot 215 and the walls 227 and 229 associated with the slot 225. In particular, a portion of the outer surface 114O of the arm 114 may abut the wall 217 of the tab 210 associated with the slot 215 and the wall 227 of the tab 220 associated with the slot 225. Similarly, a portion of the outer surface 116O of the arm 116 may abut the wall 219 of the tab 210 associated with the slot 215 and the wall 229 of the tab 220 associated with the slot 225. The inner clip 150, e.g., the arm 154 thereof, may contact and push the arm 114 of the outer clip 110 in the direction B2 such that the arm 114 pushes and locks against the walls 217 and 227 of the tabs 210 and 220, respectively. Similarly, the inner clip 150, e.g., the arm 156 thereof, may contact and push the arm 116 of the outer clip 110 in the direction B1 such that the arm 116 pushes and locks against the walls 219 and 229 of the tabs 210 and 220, respectively. The fastening system 100 may therefore secure the tabs 210 and 220 such that there is minimal or no relative movement therebetween while the mounting tool 200 retains the component 90 for undergoing the high temperature process.

When subjected to extreme temperatures (e.g., temperatures reaching (1065.6° C.) 1950° F. or over), the outer clip 110 and the inner clip 150 may experience thermal expansion. Such extreme temperatures may compromise the fastening of prior art fasteners, e.g., the fasteners 70 and 80. Conversely, these extreme temperatures may serve to strengthen the fastening provided by the fastening system 100. Specifically, the extreme temperatures may cause the outer clip 110 and the inner clip 150 to thermally expand; the arms 154 and 156 of the inner clip 1 may push against the arms 114 and 116 of the outer clip 110, and thereby, cause the arms 114 and 116 of the outer clip 110 to press against the walls 217 and 219 associated with the slot 215 and the walls 227 and 229 associated with the slot 225 with increased force (relative to the force applied by the arms 114 and 116 to the walls 217, 219, 227, and 229 at room temperature). Such may further ensure that the mounting tool 200 remains fastened while the component 90 is secured within the mounting tool 200 and undergoes the high-temperature process.

The outer clip 110 and the inner clip 150 may be made of any suitable material that can withstand extreme temperatures of the high-temperature process. In certain embodiments of the disclosure, the material selected for the outer clip 110 and the inner clip 150 may be selected for its durability and/or its thermal expansion properties. In an example implementation, the outer clip 110 and the inner clip 150 may be made of Hastelloy-x (Hastelloy is a trademark of Haynes International, Inc.). The outer clip 110 and the inner clip 150 may be constructed via any suitable manufacturing processes now known or subsequently developed. For example, the outer clip 110 and the inner clip 150 may be water jet or laser cut from sheet metal.

Figure 7:
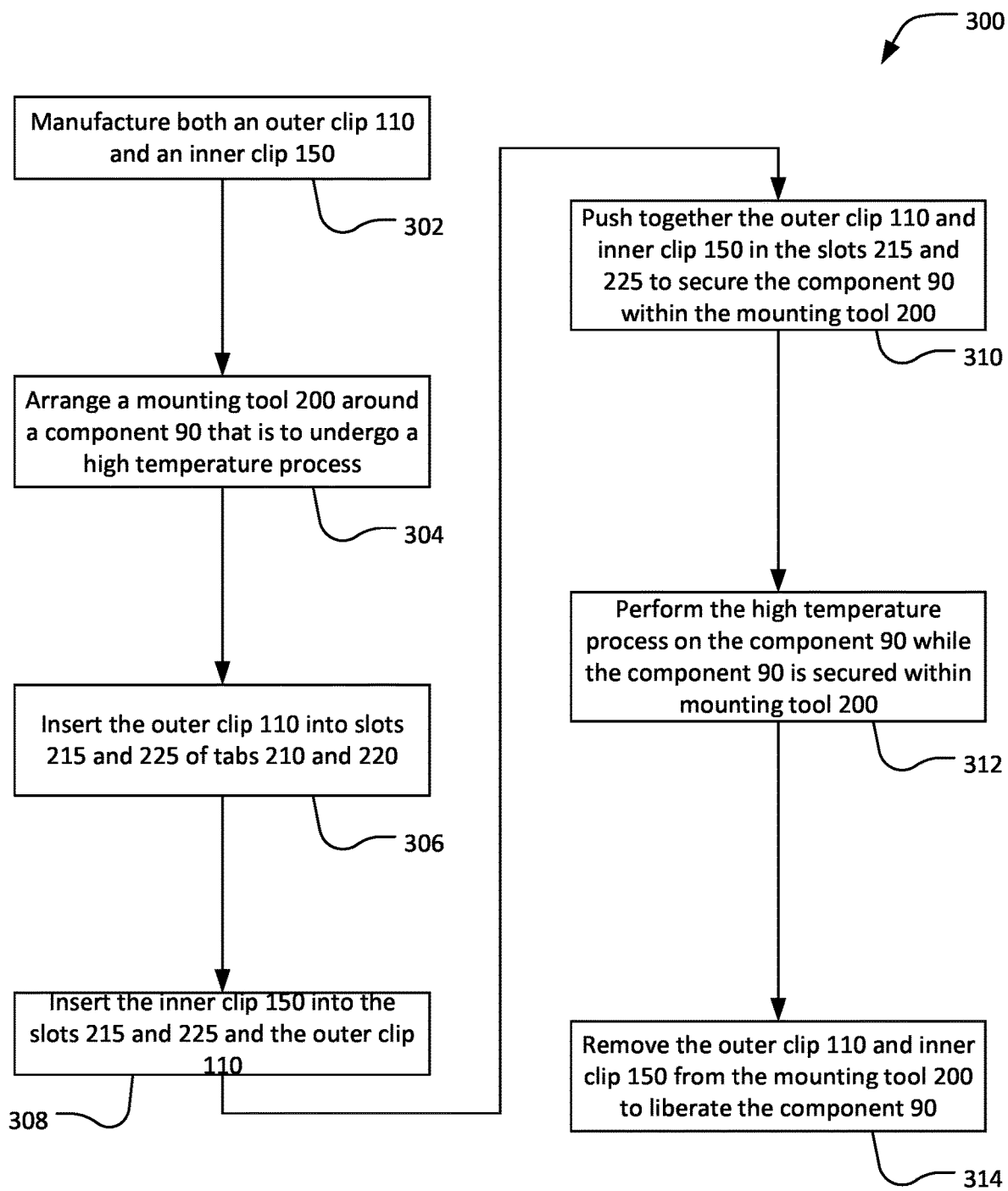
FIG. 7 is a flow diagram depicting a method of making and using the fastening system of FIG. 2, according to an embodiment of the present disclosure.

FIG. 7 is a flowchart illustrating an example method 300 of making and using the fastening system 100 for use with the mounting tool 200 to retain the component 90 during a high-temperature process. First, at step 302, both the outer clip 110 and the inner clip 150 may be fabricated (or outer clip 110 and inner clip 150 may be fabricated by a third party and obtained for use). Next, at step 304, the mounting tool 200 may be arranged around the component 90. The mounting tool 200 may be configured to retain the component 90, and in embodiments, mask portions thereof.

At step 306, the outer clip 110 may be inserted into the mounting tool 200 to temporarily retain the component 90 within the mounting tool 200. Specifically, the outer clip 110 may be inserted into the slot 215 of the tab 210 and the slot 225 of the tab 220 of the mounting tool 200. At step 308, the inner clip 150 may be inserted into the outer clip 110 while the outer clip 110 is within the slots 215 and 225. Specifically, the inner clip 150 may be placed in the gap 138 of the outer clip 110 as discussed herein. At step 310, the user may push together the outer clip 110 and inner clip 150 to lock the mounting tool 200 in place. This step may be accomplished with the help of tools, such as a vice grip. As described above, pushing the inner clip 150 further into the outer clip 110 may push the arms 114 and 116 of the outer clip 110 outboard against the walls 217 and 219 associated with the slot 215 and walls 227 and 229 associated with the slot 225 (i.e., the arm 114 may push in the direction B2 against the walls 217 and 227 and the arm 116 may push in the direction B1 against the walls 219 and 229). In this way, the fastening system 100 may temporarily and selectively secure the component 90 to the mounting tool 200.

At step 312, a high-temperature process may be performed on the component 90 while the component 90 is secured within the mounting tool 200. In certain embodiments of the disclosure, the high-temperature process may be a coating process.

Then, at step 314, once the high temperature process is complete, the fastening system 100 may be unlocked and removed from the mounting tool 200, freeing the component 90. This may involve, for example, using a tool, such as but not limited to, pliers to exploit the windows 142 and 168 of the outer clip 110 and inner clip 150, respectively, to pry the outer clip 110 and the inner clip 150 out from the slots 215 and 225.

Steps of method 300 may be readily omitted, added to, and/or modified to implement the various embodiments of the fastening system 100 as embodied by the disclosure and described herein. For example, the step 302 directed to manufacturing the outer clip 110 and the inner clip 150 may be omitted in some embodiments (e.g., where the outer clip 110 and the inner clip 150 have already been manufactured, such as when the fastening system 100 is procured from a third-party manufacturer). Thus, as has been described, the fastening system 100 may secure the component 90 to the mounting tool 200 to allow the component 90 to undergo a high temperature process, such as a coating process. Because of the geometry and arrangement of the outer clip 110 and the inner clip 150, the outer clip 110 and the inner clip 150 may thermally expand during the high-temperature process to improve fastening efficacy. The outer clip 110 and the inner clip 150 may be disassociated from the mounting tool 200 in a non-destructive fashion and may be reused to fasten other components in the same or different mounting tools.

Figure 8A:
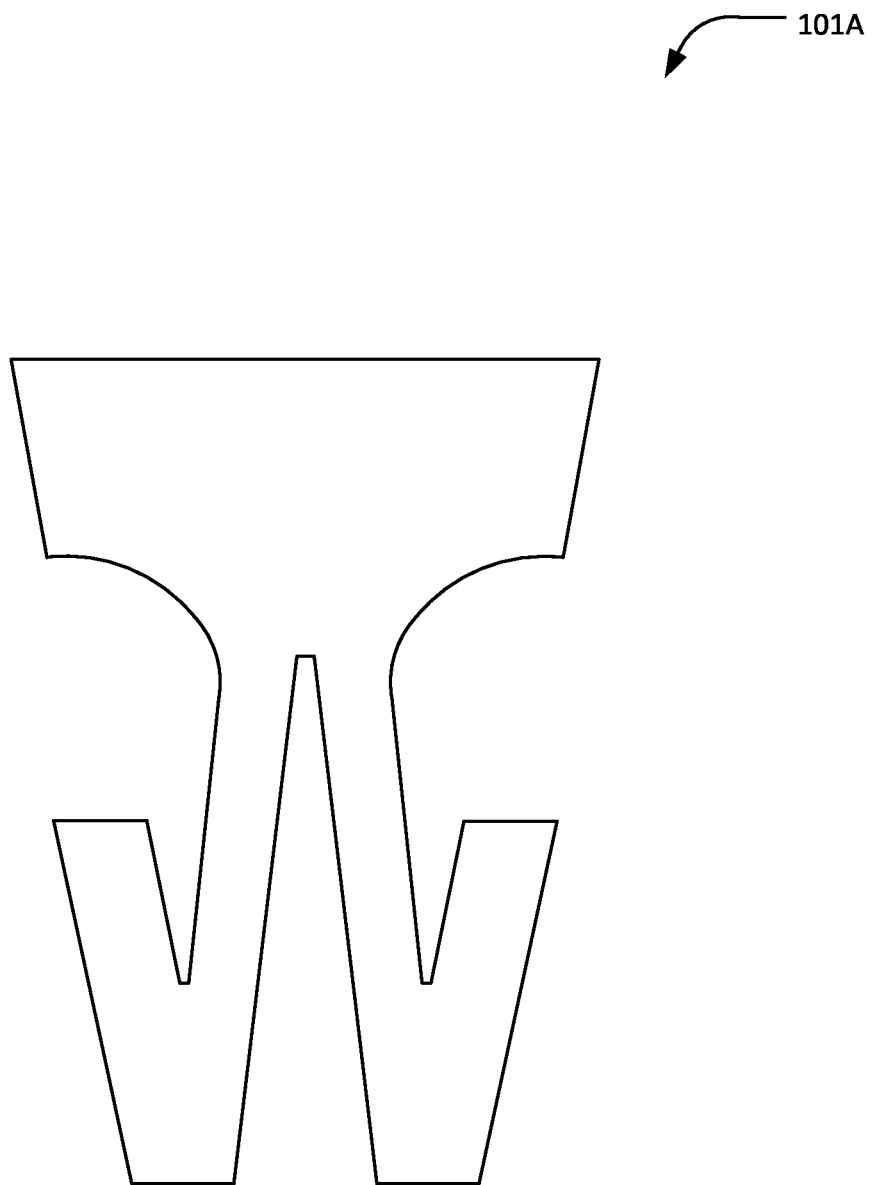
FIGS. 8A to 8Y are each a top view of an alternate fastening system for securing a component to a mounting tool, according to alternate embodiments of the present disclosure.
Figure 8B:
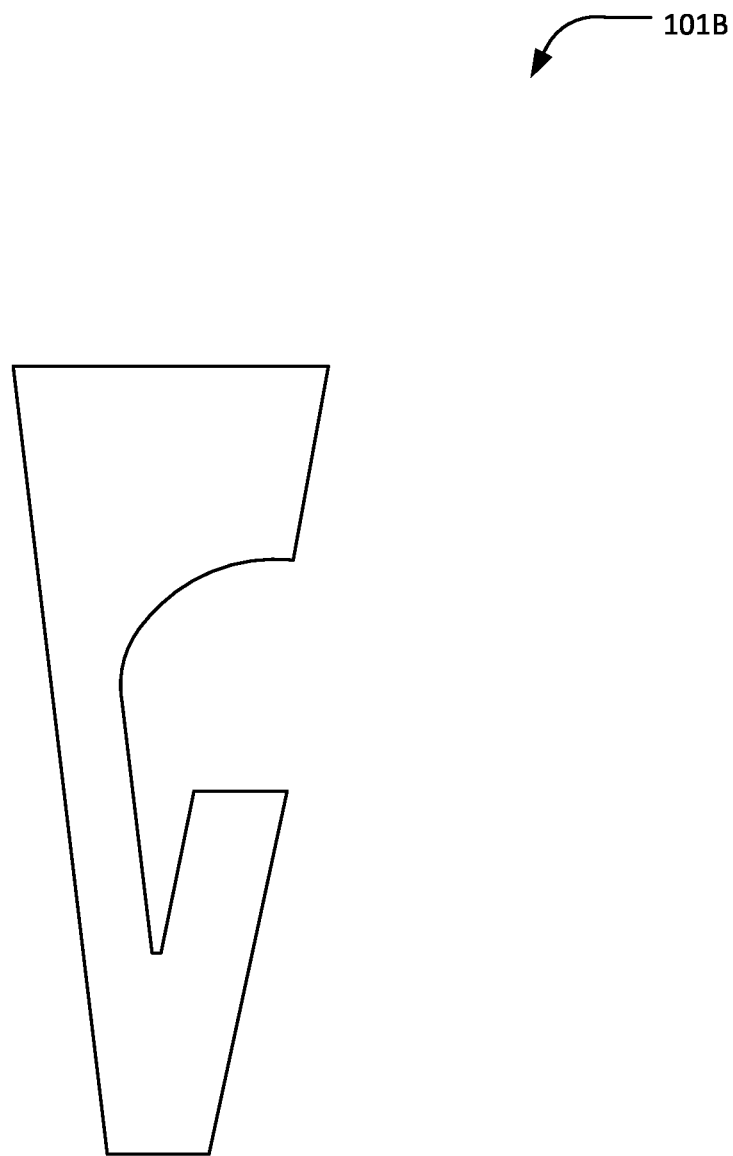
Figure 8C:
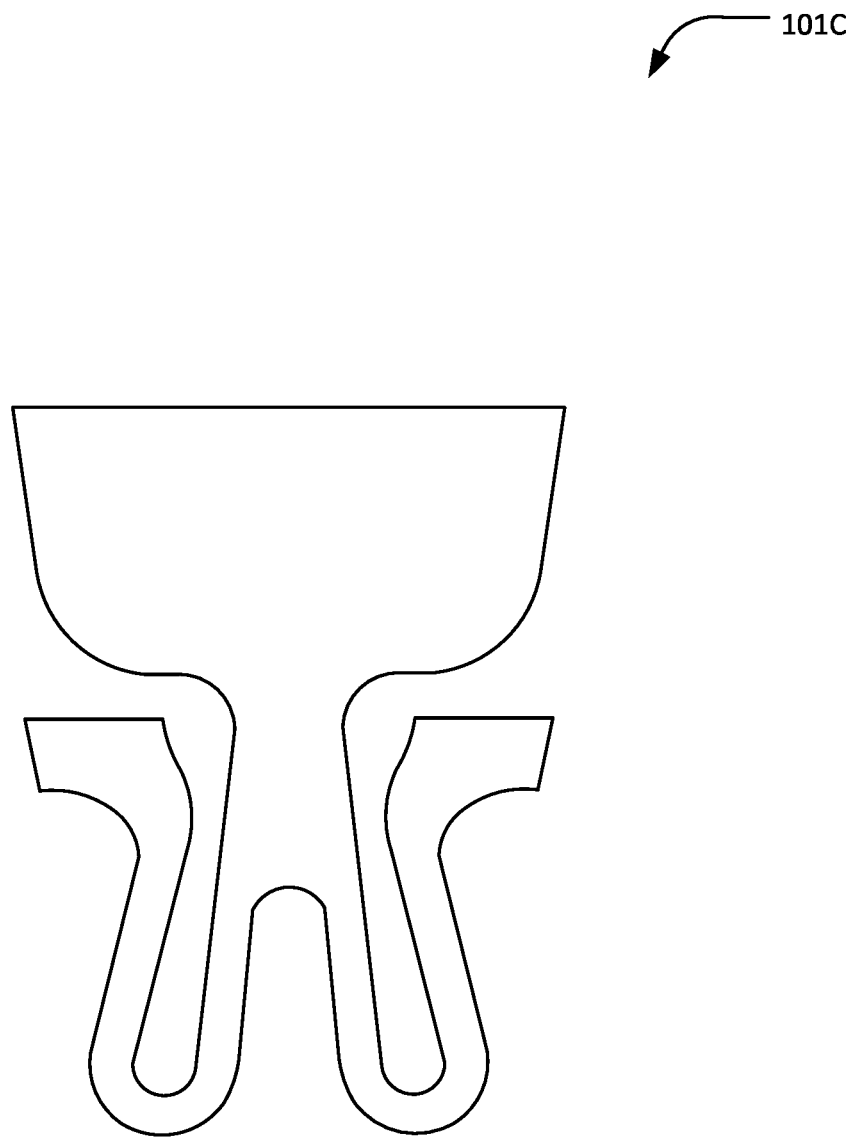
Figure 8D:
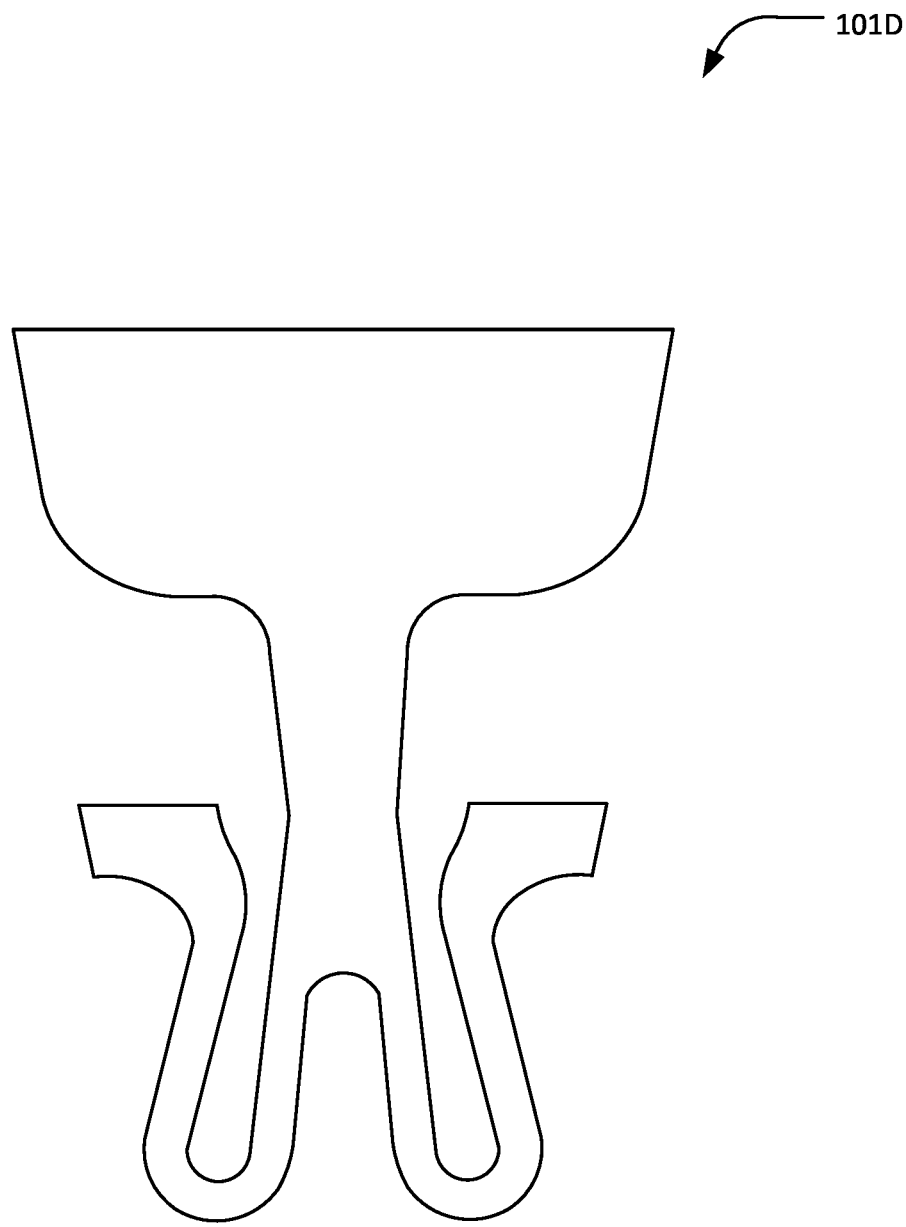
Figure 8E:
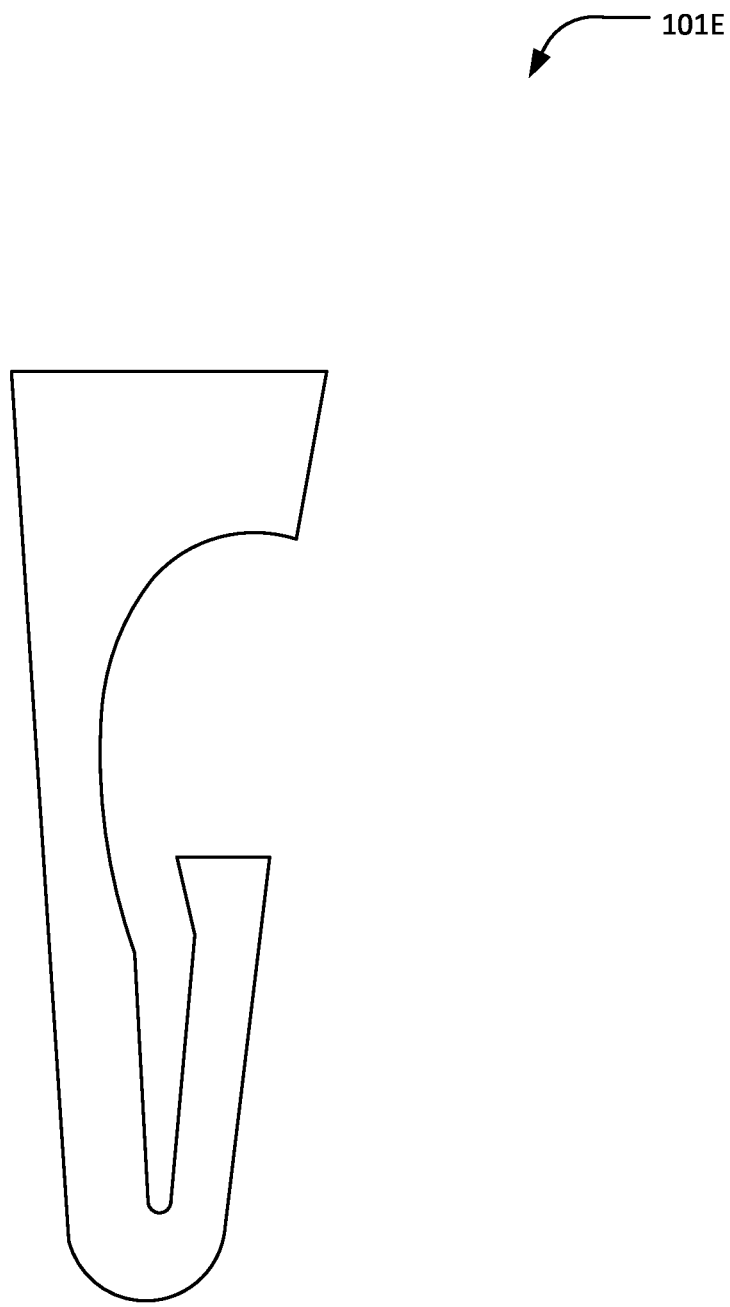
Figure 8F:
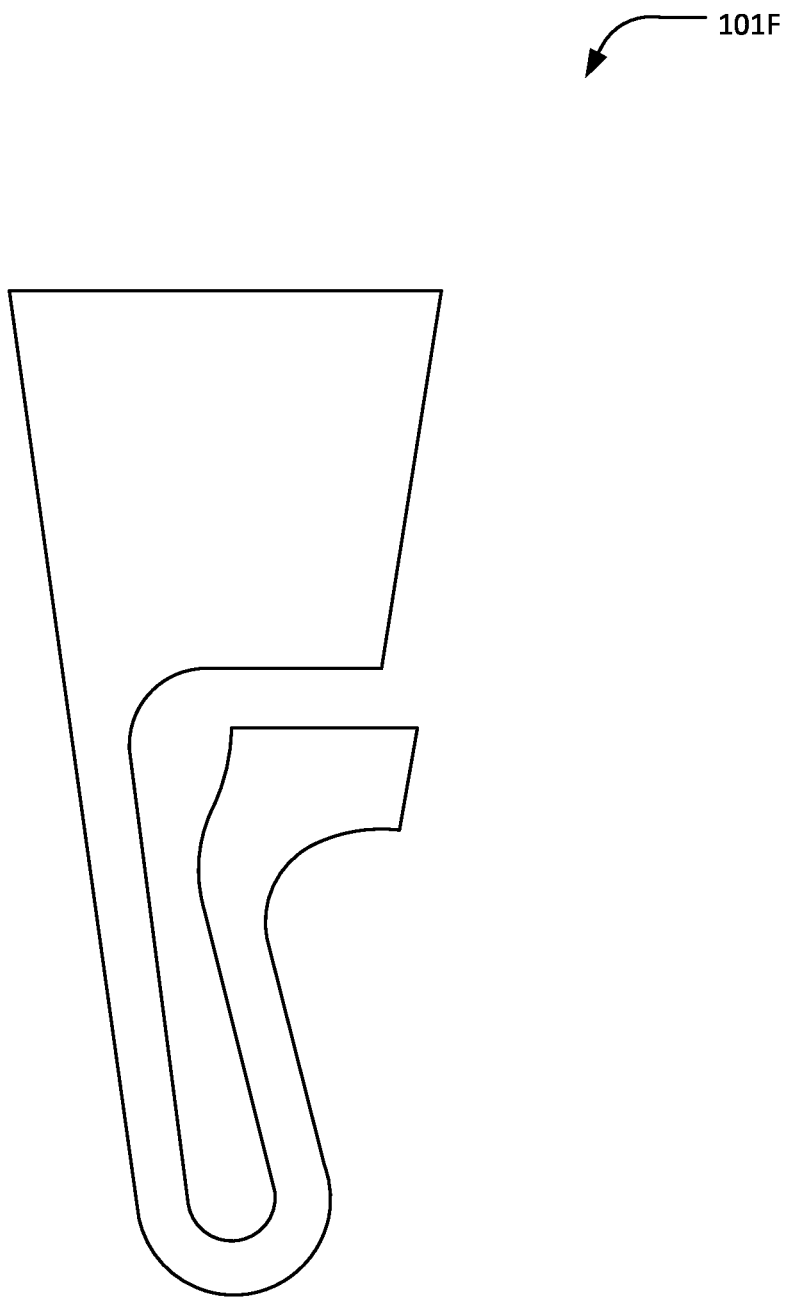
Figure 8G:
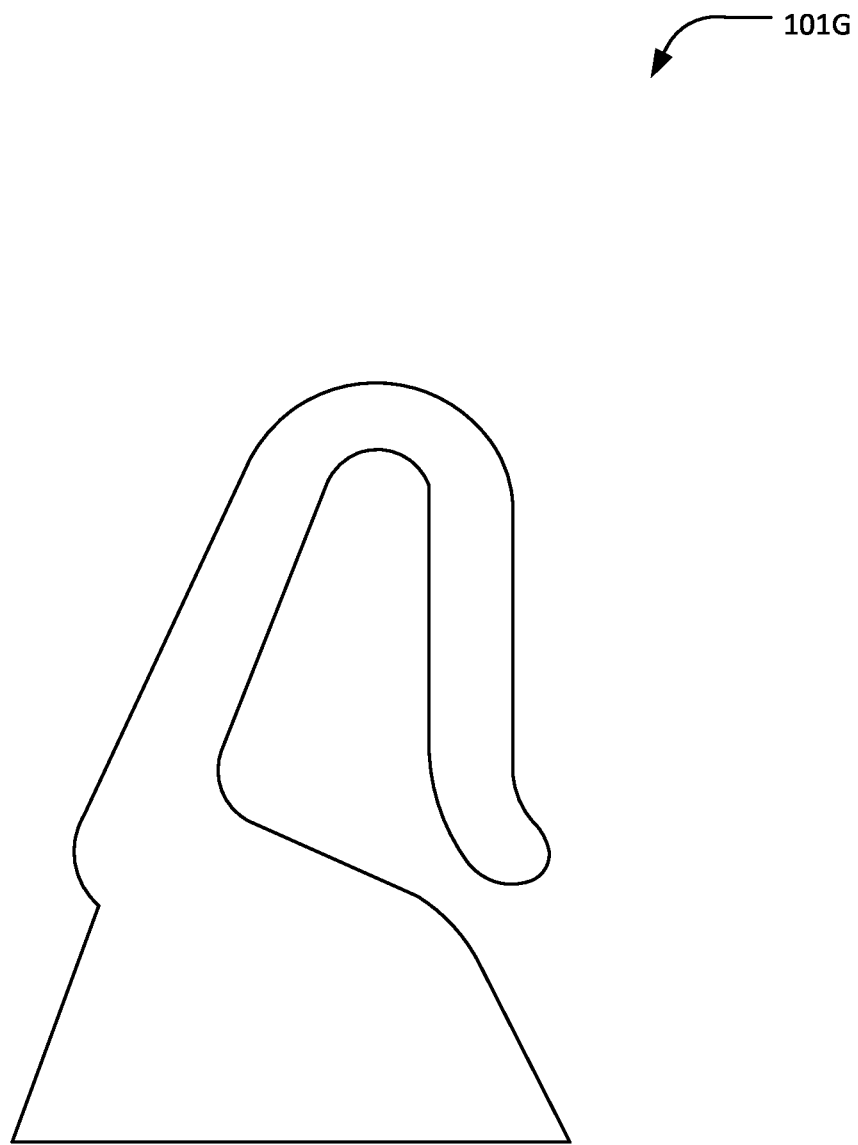
Figure 8H:
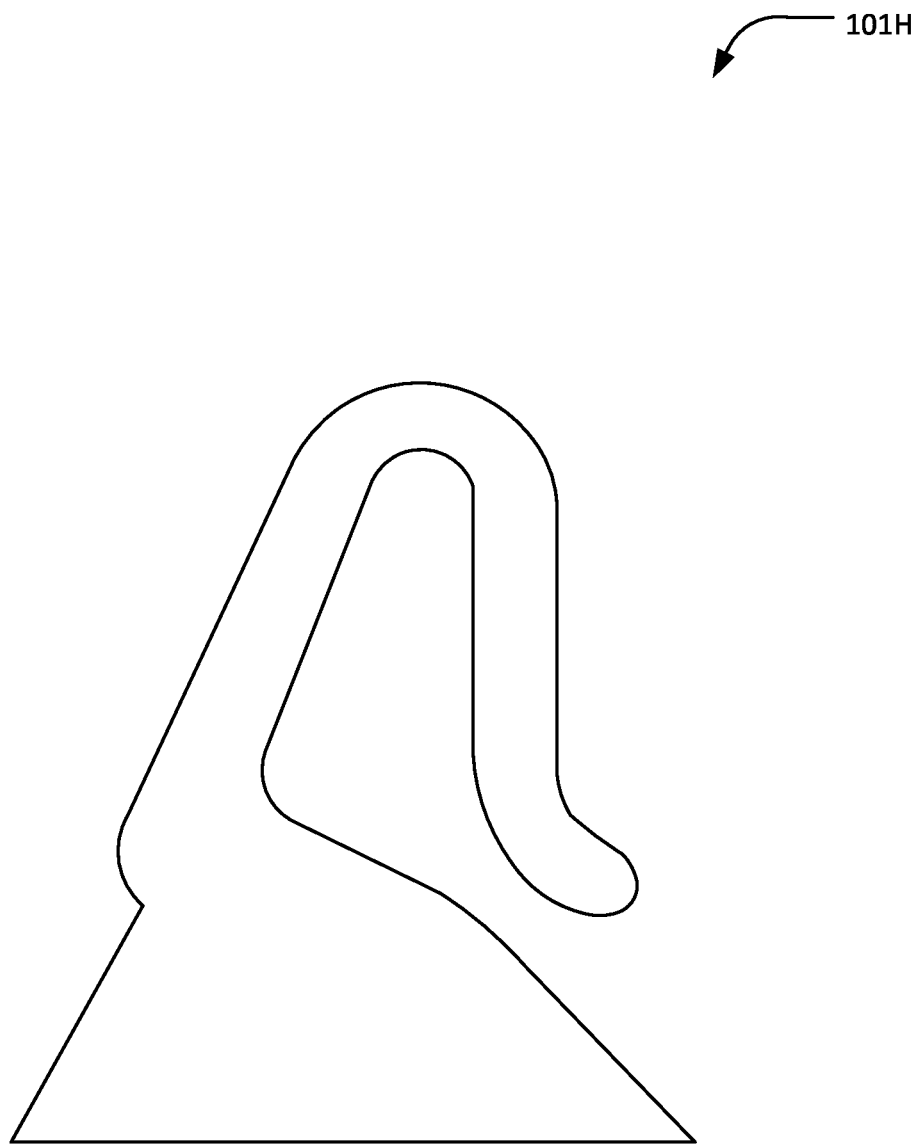
Figure 8I:
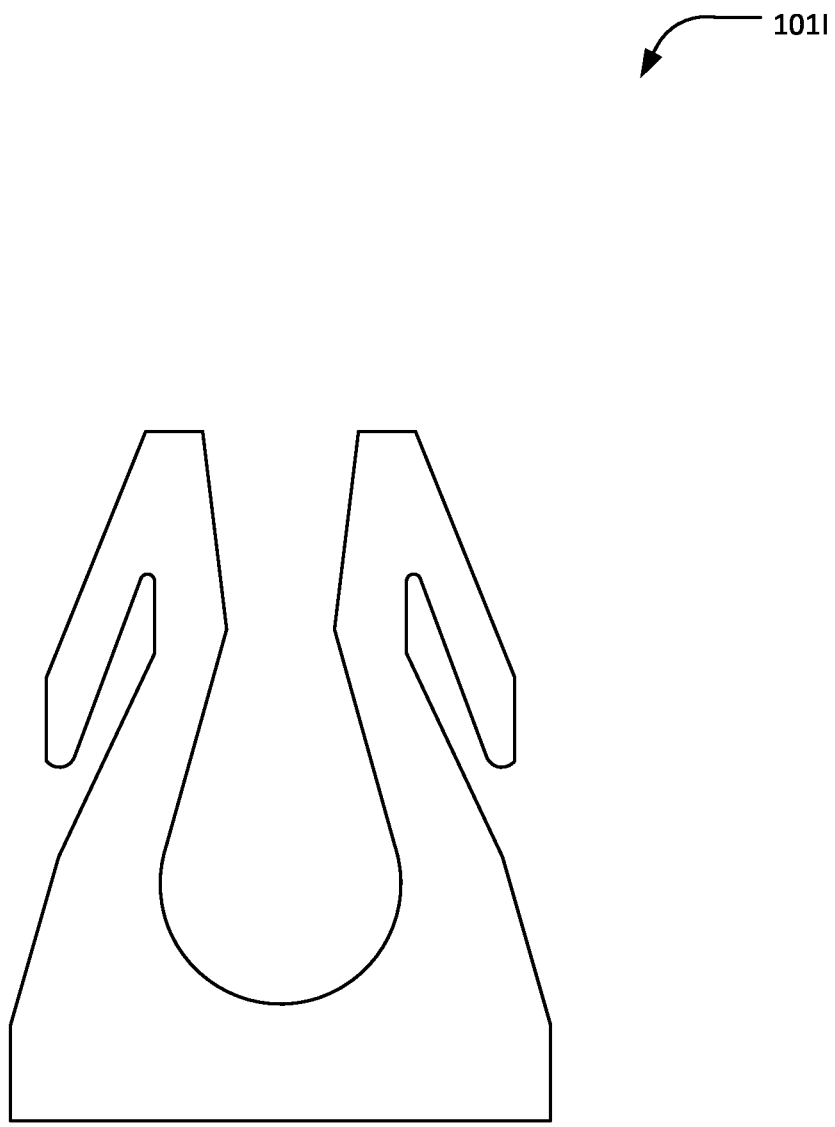
Figure 8J:
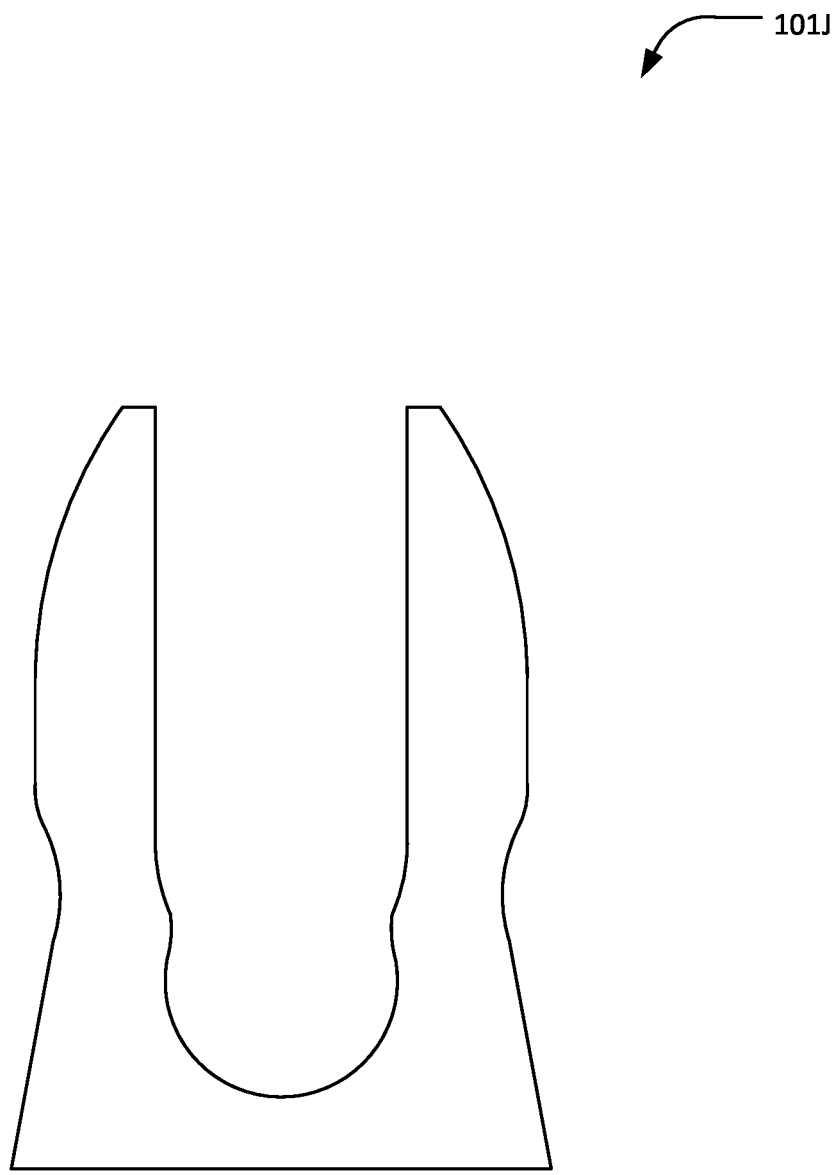
Figure 8K:
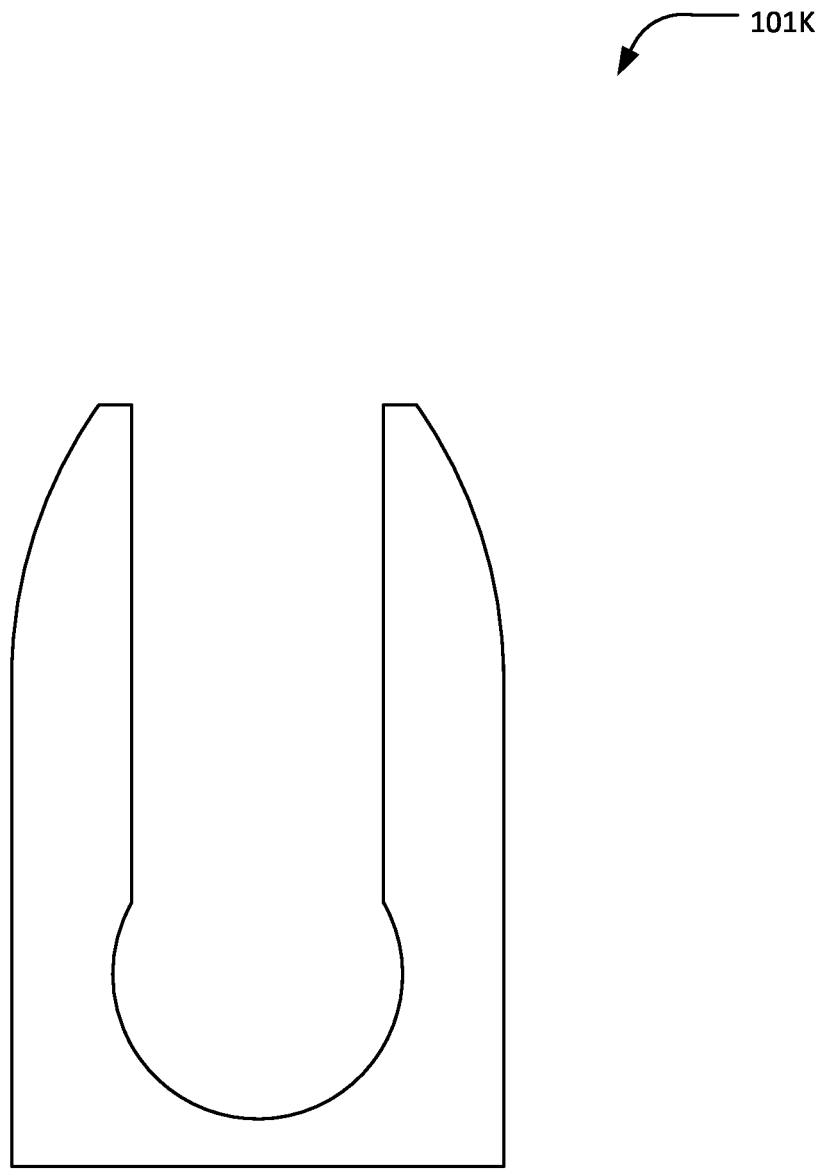
Figure 8L:
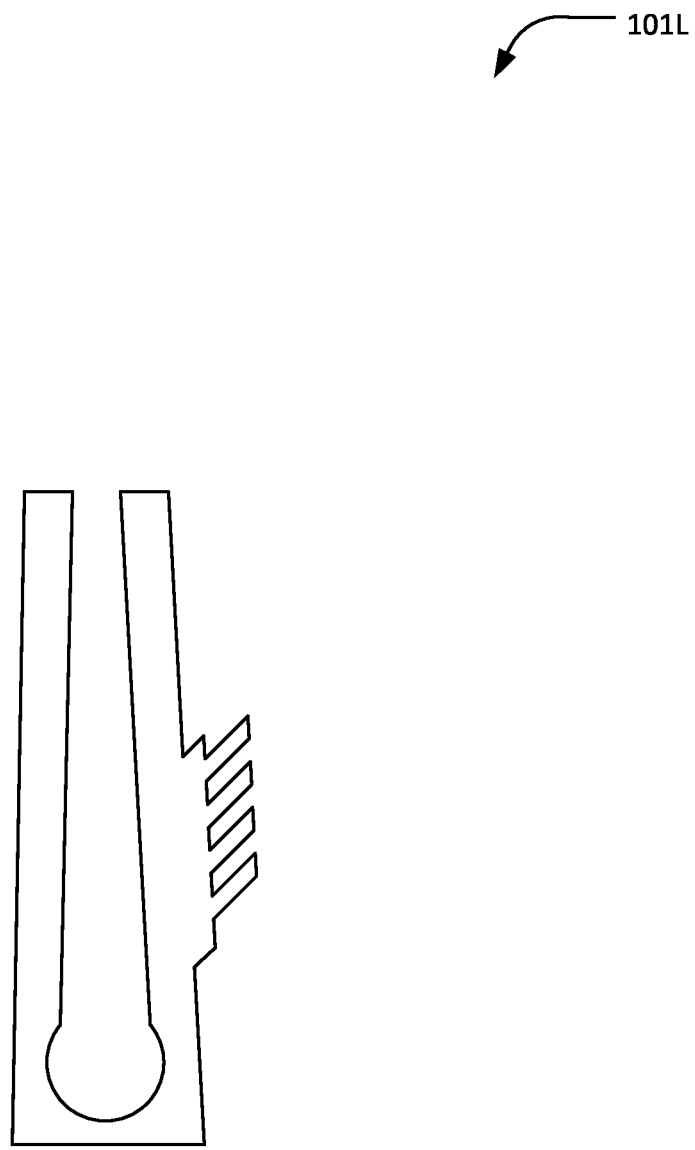
Figure 8M:
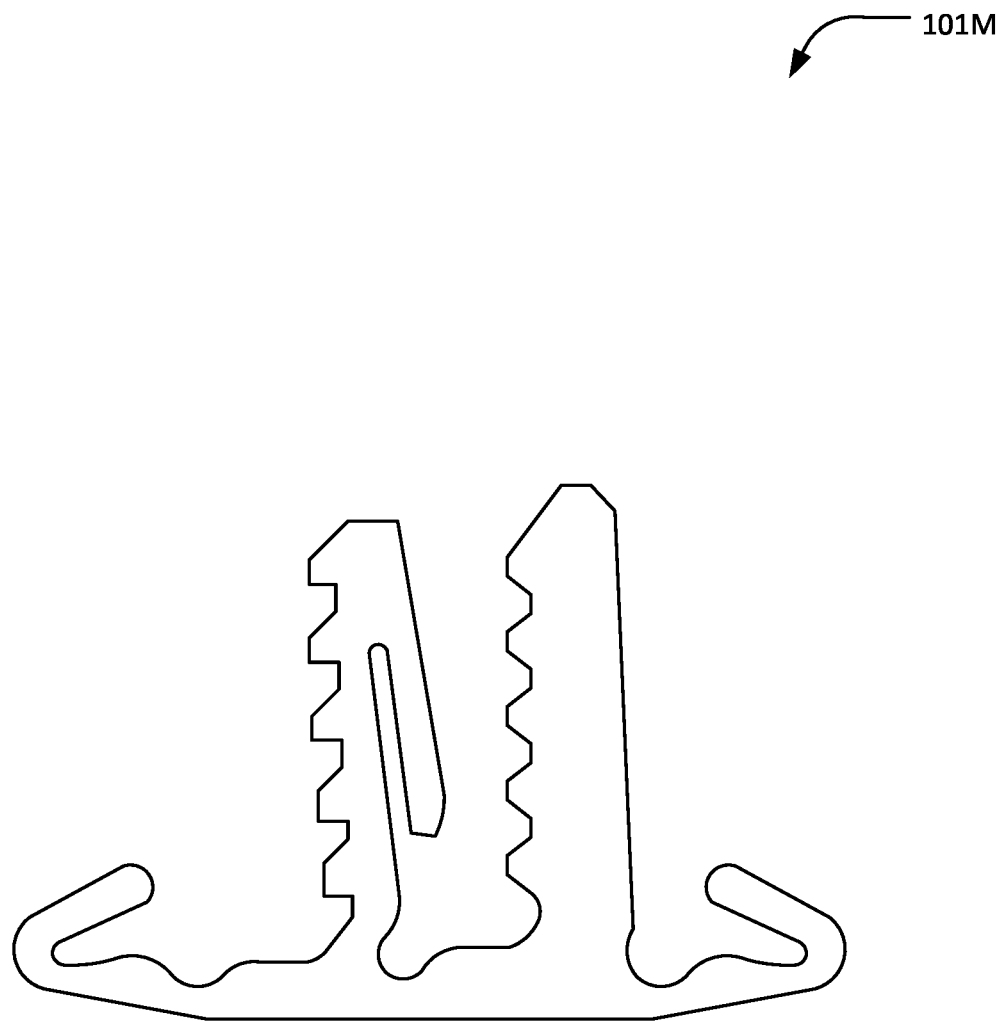
Figure 8N:
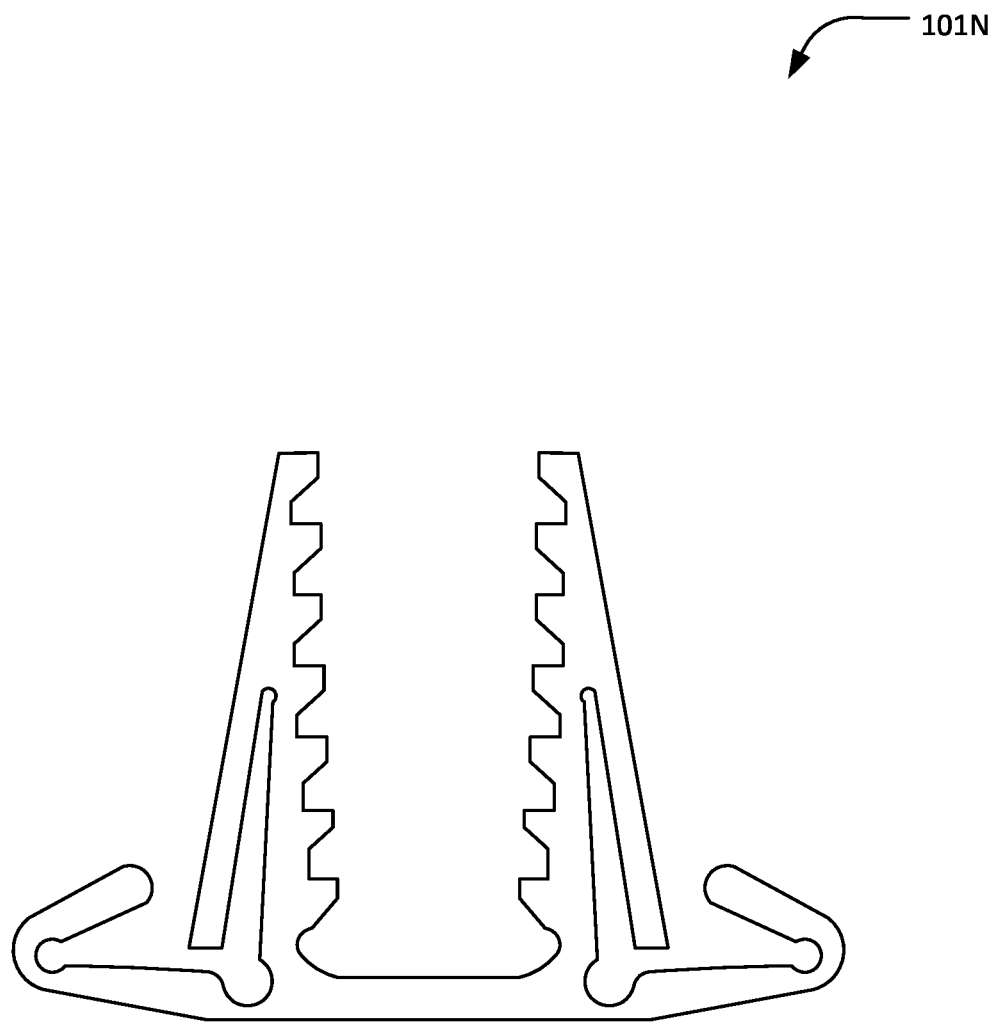
Figure 8O:
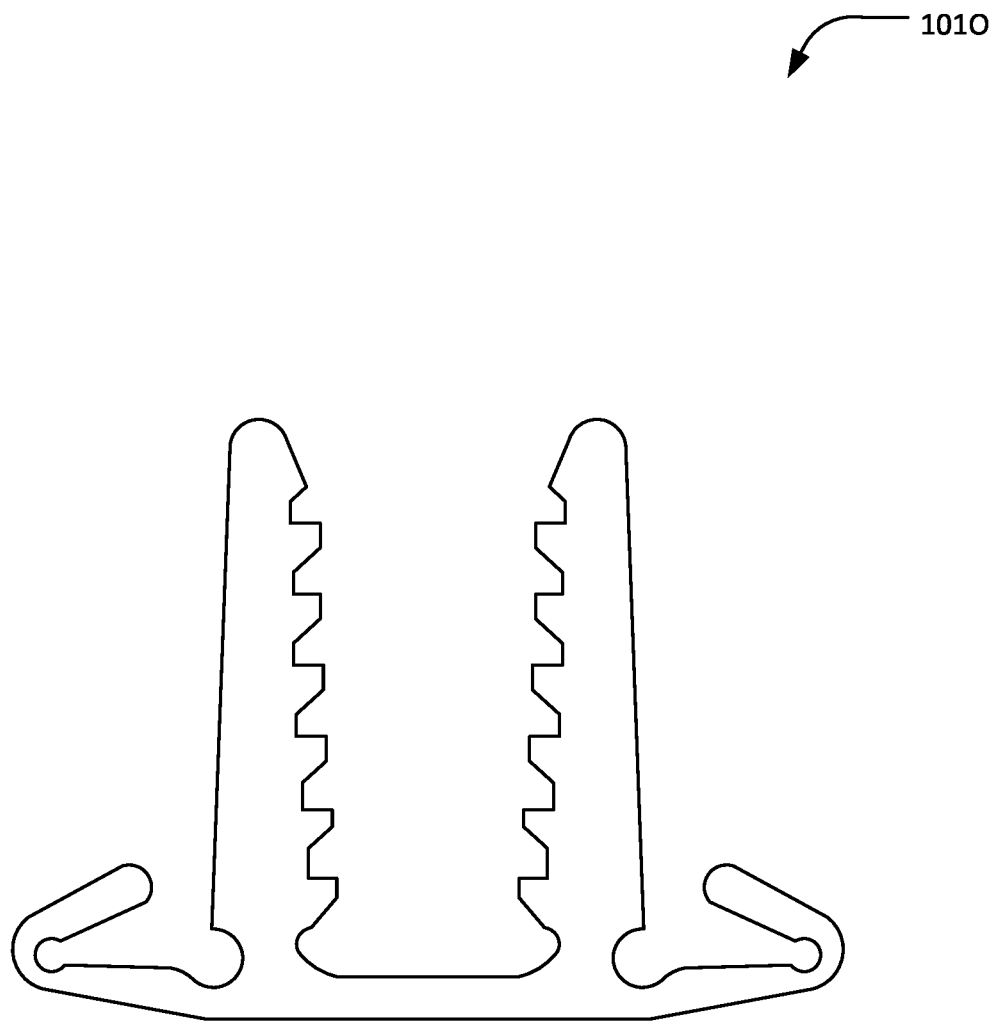
Figure 8P:
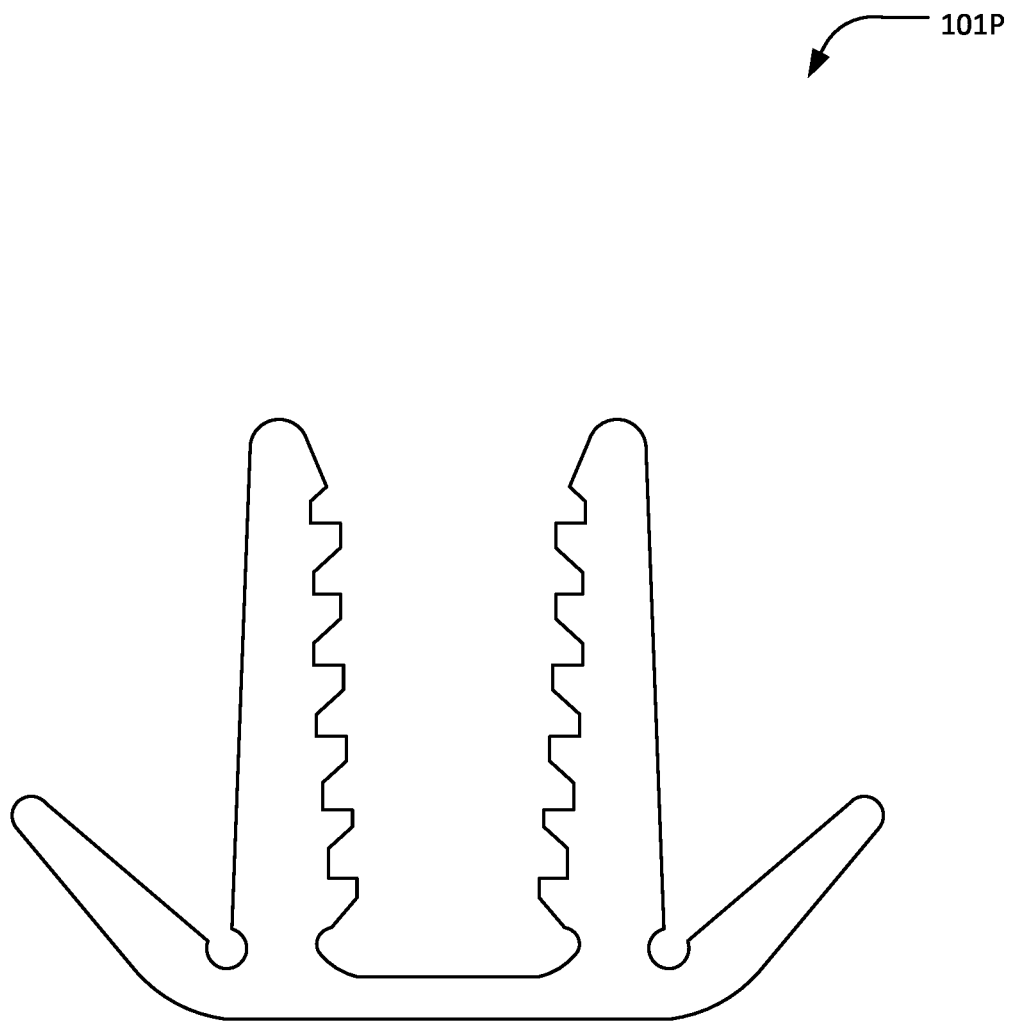
Figure 8Q:
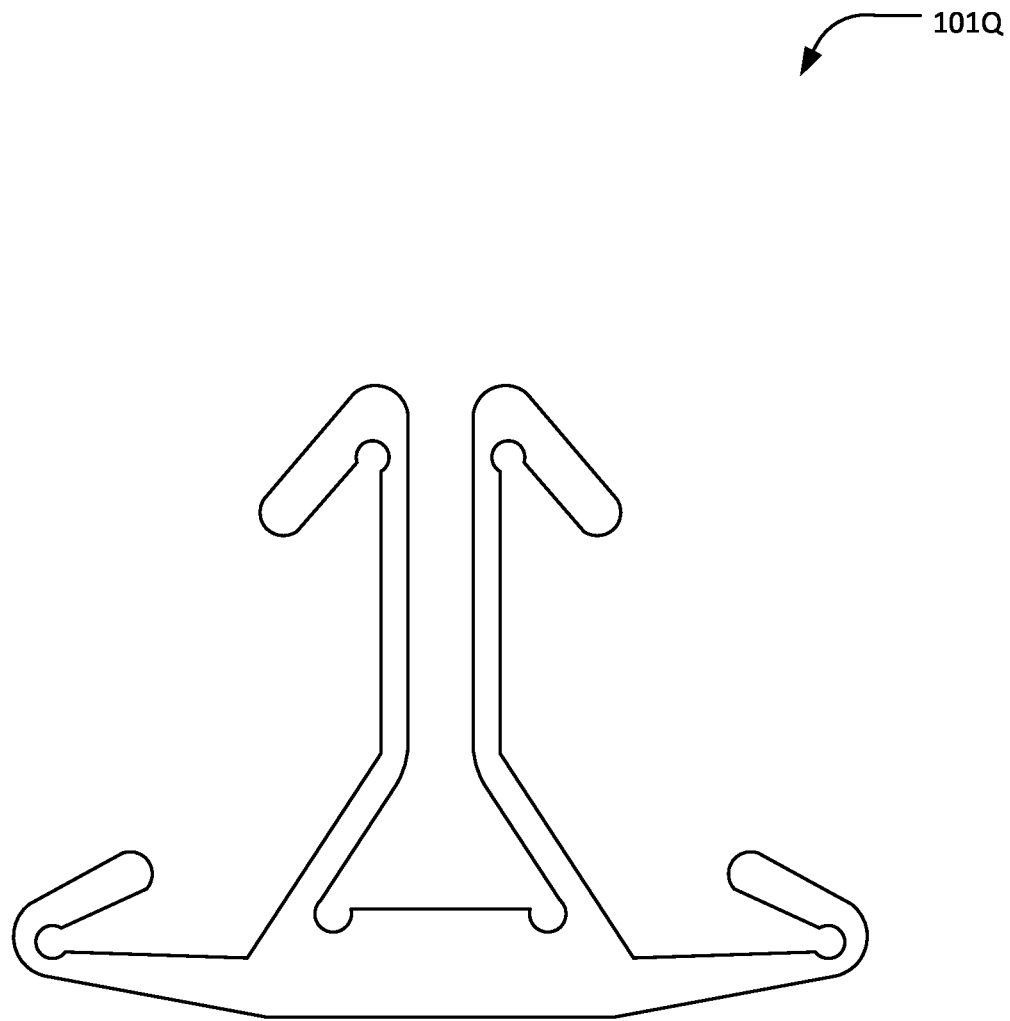
Figure 8R:
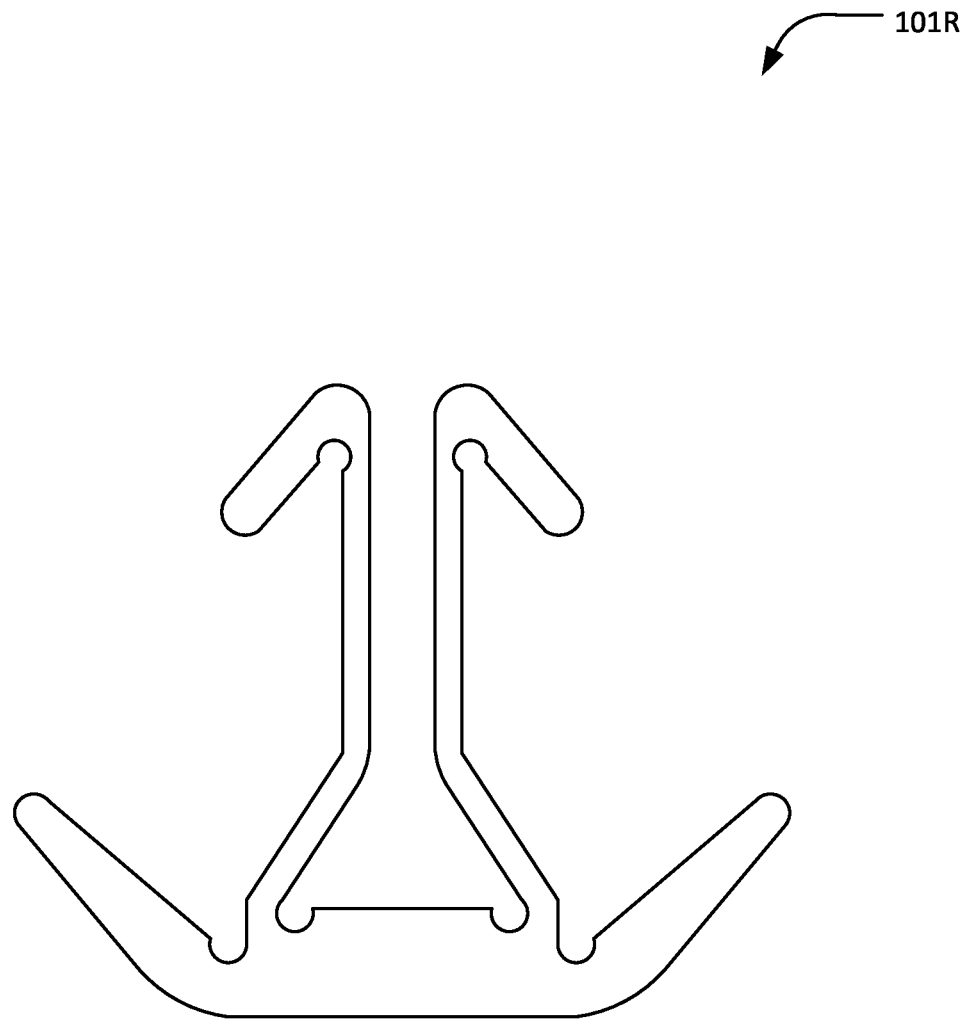
Figure 8S:
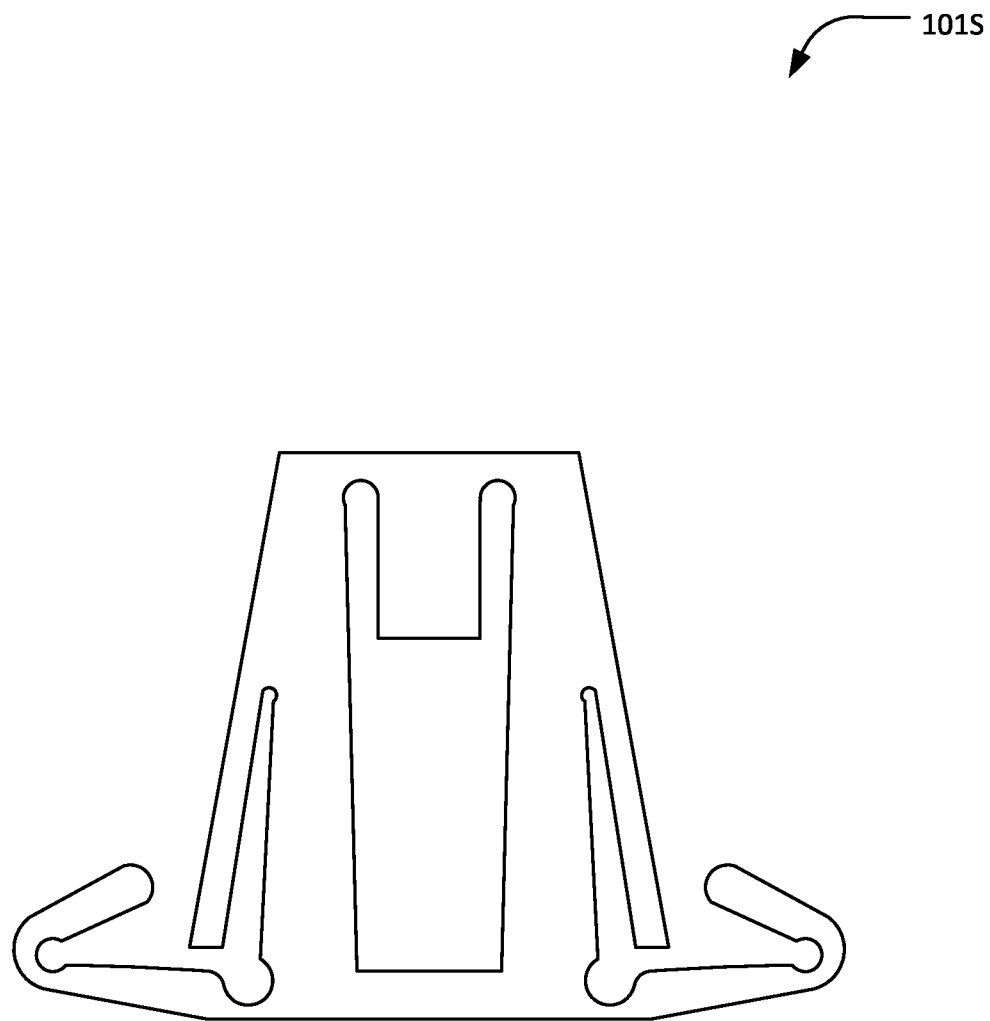
Figure 8T:
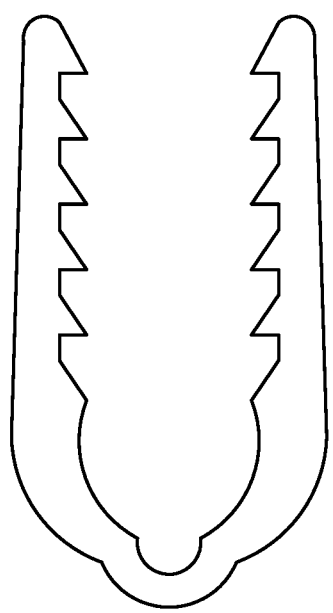
Figure 8U:
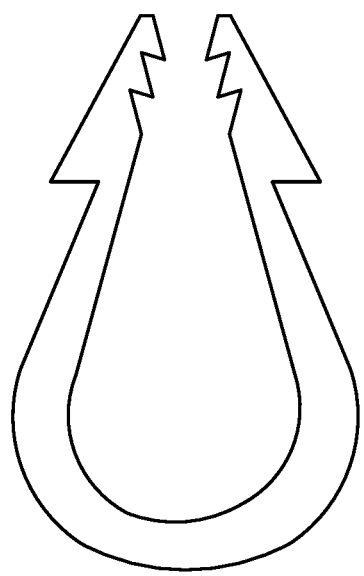
Figure 8V:
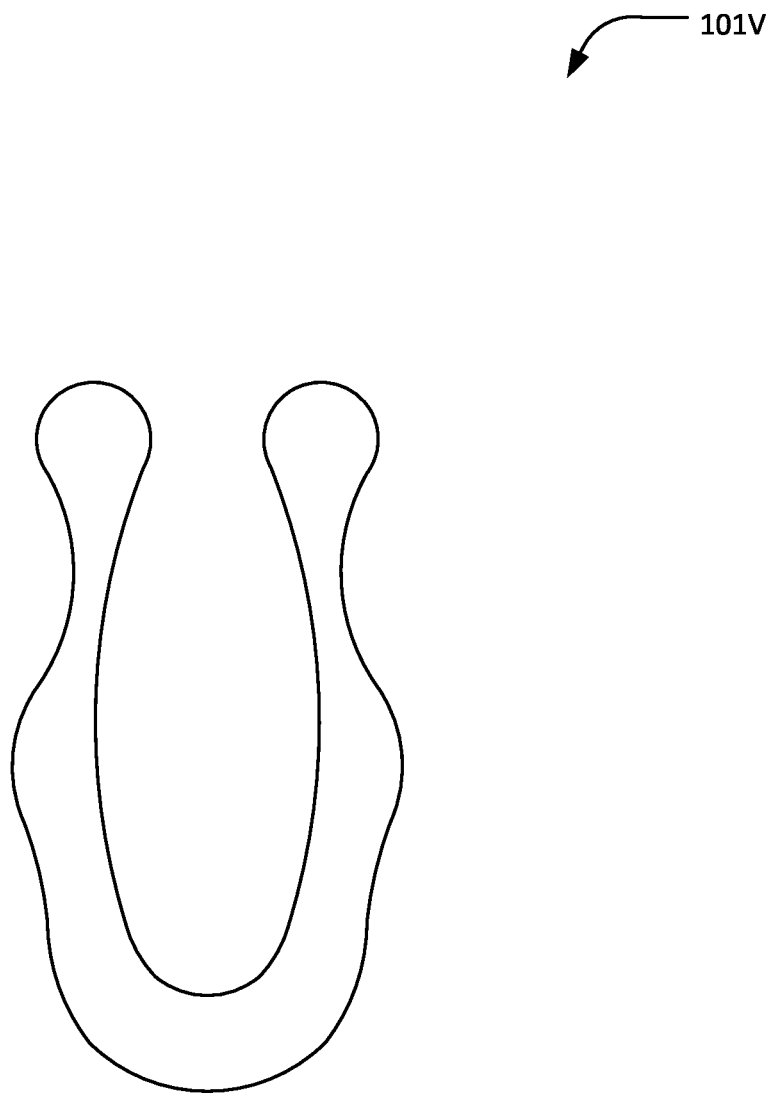
Figure 8W:
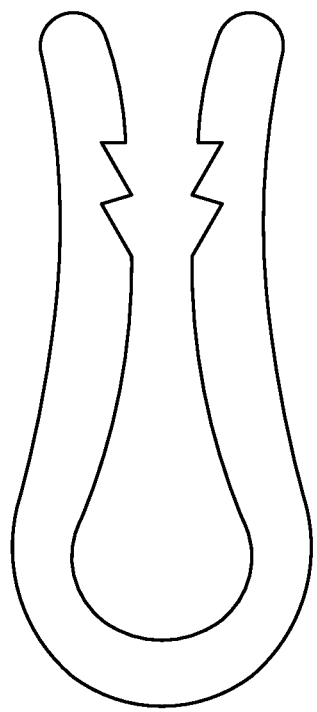
Figure 8X:
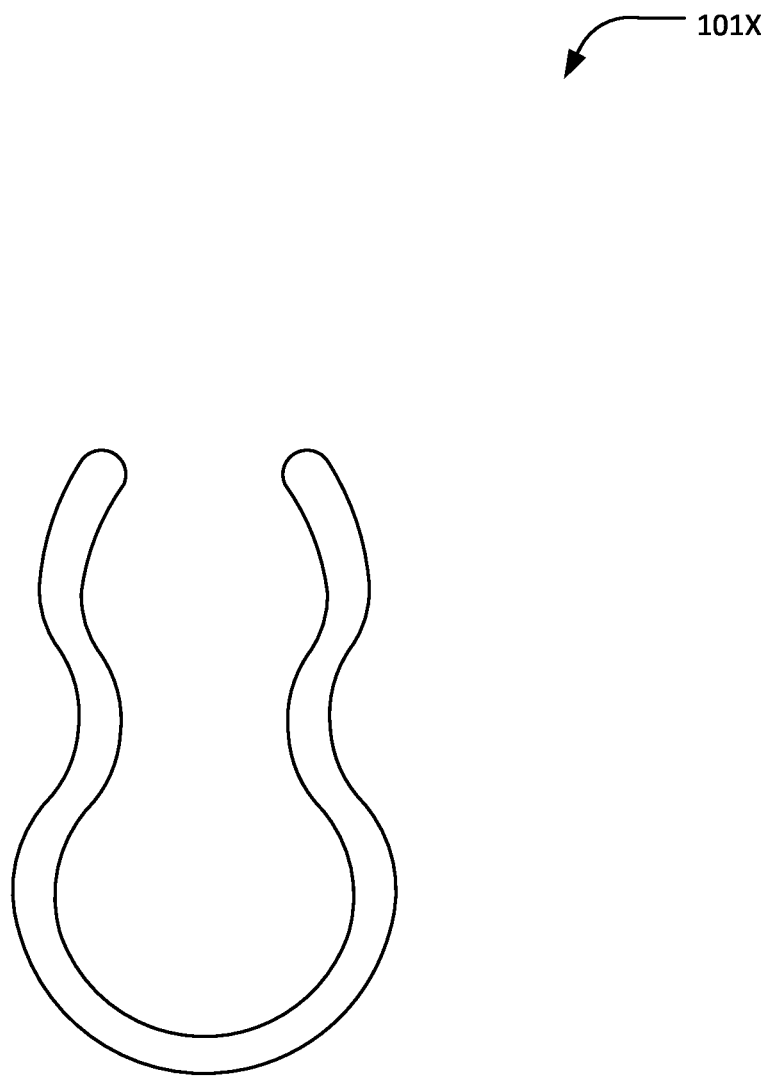
Figure 8Y:
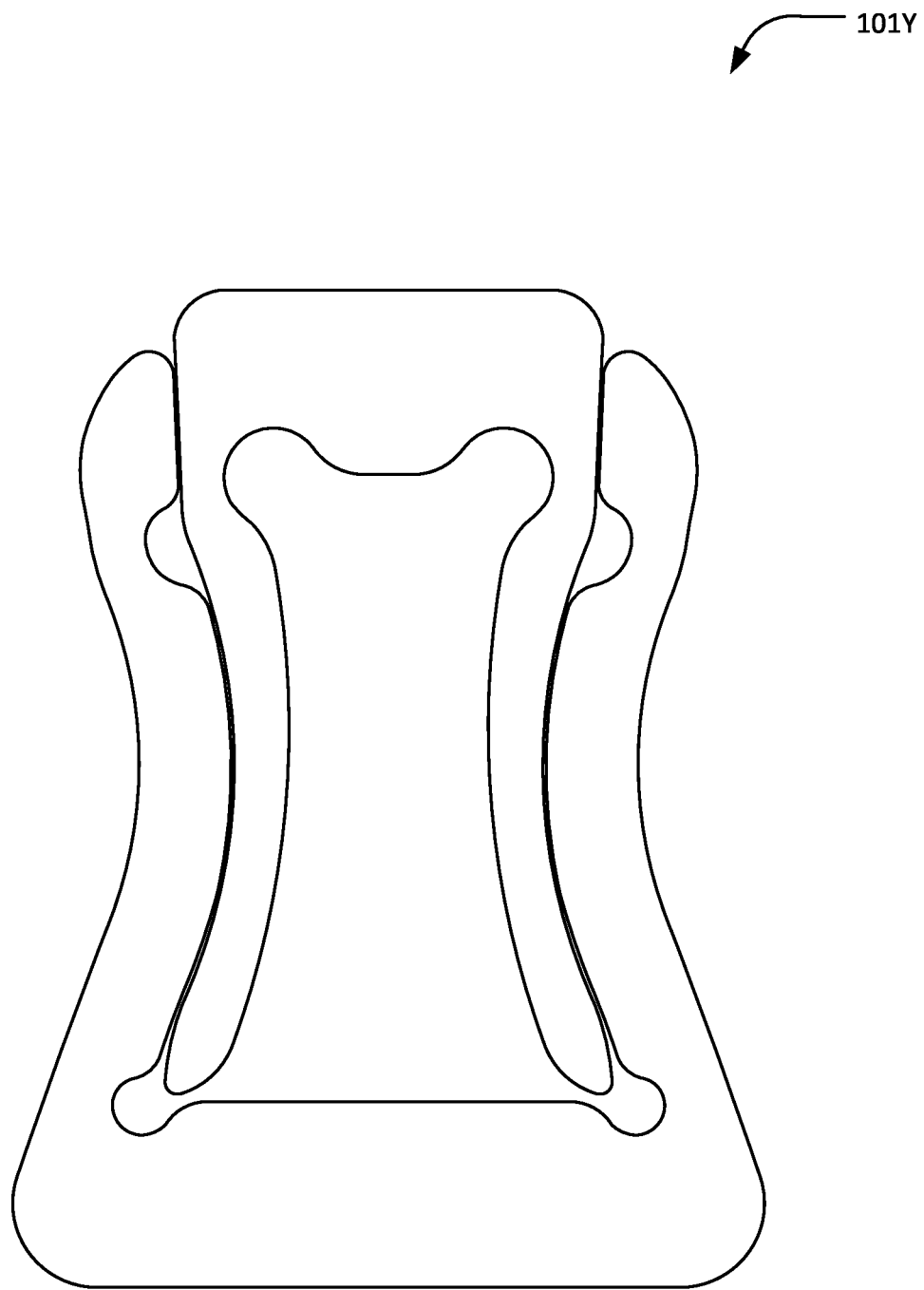

FIG. 8A shows an alternate fastening system 101A that may be used to secure a component to a mounting tool (e.g., secure component 90 to mounting tool 200) for a high-temperature process. Each of FIGS. 8B to 8Y respectively show alternate fastening systems 101B to 101Y that may likewise be used to secure a component to a mounting tool for a high-temperature process. Some of the fastening systems 101A to 101Y may have some of the same or similar features as the fastening system 100 and/or may employ the same or similar principles as the fastening system 100. One having skill in the art will be able to readily ascertain the similarities or differences between the fastening system 100 and each of the fastening systems 101A to 101Y.

Some non-exhaustive implementation examples are described below.

In an implementation, a fastening system for securing a mounting tool configured to retain a component that is to undergo a high-temperature process is provided. The mounting tool has a first portion and a second portion. The first portion includes a first tab with a first slot and the second portion includes a second tab with a second slot. The first tab and the second tab are usable to secure the first portion to the second portion while the component is retained within the mounting tool. The fastening system comprises an outer clip including outer clip arms and a central portion. The outer clip arms have a gap therebetween. The central portion protrudes into the gap. The fastening system includes an inner clip including inner clip arms. The inner clip is configured to be pushed into the gap such that each inner clip arm contacts and pushes one outer clip arm towards the first tab and the second tab while the outer clip is retained within the first slot and the second slot. The fastening system, when inserted into the first slot and the second slot, limits relative movement between the first tab and the second tab.

In some implementations, according to any one of the preceding implementations, the outer clip arms include a first outer clip arm and a second outer clip arm. Each of the first outer clip arm and the second outer clip arm include a bowed section.

In some implementations, according to any one of the preceding implementations, the bowed section of the first outer clip arm curves in a first direction and the bowed section of the second outer clip arm curves in a second direction. The second direction is opposite the first direction.

In some implementations, according to any one of the preceding implementations, the inner clip arms include a first inner clip arm and a second inner clip arm. The first inner clip arm includes a bowed portion corresponding to the bowed section of the first outer clip arm.

In some implementations, according to any one of the preceding implementations, the first outer clip arm contacts one end of each of the first slot and the second slot, and the second outer clip arm contacts an opposing end of each of the first slot and the second slot.

In some implementations, according to any one of the preceding implementations, each of the outer clip arms has an inner surface and an outer surface. Each inner surface of each outer clip arm includes a recess.

In some implementations, according to any one of the preceding implementations, the gap includes a central portion and two channels. Each of the two channels are configured to accept one of the inner clip arms.

In some implementations, according to any one of the preceding implementations, each of the two channels includes a rounded end spaced apart from an associated inner clip arm.

In some implementations, according to any one of the preceding implementations, the fastening system includes a window in at least one of the outer clip and the inner clip.

In some implementations, according to any one of the preceding implementations, the fastening system is reusable.

In some implementations, according to any one of the preceding implementations, each of the outer clip arms extends from a curved shoulder.

In some implementations, according to any one of the preceding implementations, each of the outer clip arms expands during the high-temperature process in an outboard direction to push against the first tab and the second tab with an increased force relative to a force exerted by the outer clip arms in the outboard direction prior to the high-temperature process.

In some implementations, according to any one of the preceding implementations, the component is an aviation component.

In some implementations, according to any one of the preceding implementations, the component is selected from the group consisting of a turbine blade, a turbine vane, a compressor blade, and a compressor vane.

In some implementations, a fastening system for securing a mounting device configured to retain a component while the component undergoes a high-temperature process is disclosed. The mounting device has a first portion having a first tab and a second portion having a second tab. The first tab has a first slot and the second tab has a second slot. The fastening system comprises an outer clip having a body with a first shoulder on a first side and a second shoulder on a second side. A first outer clip arm extends from the first shoulder and a second outer clip arm extends from the second shoulder. The first outer clip arm and the second outer clip arm have a gap therebetween. The fastening system includes an inner clip having a body, a first inner clip arm, and a second inner clip arm. The inner clip is configured to be pushed into the gap such that the first inner clip arm is inwardly adjacent the first outer clip arm and the second inner clip arm is inwardly adjacent the second outer clip arm. When the inner clip is pushed into the gap, the first inner clip arm is configured to push the first outer clip arm towards a first end of each of the first slot and the second slot and the second inner clip arm is configured to push the second outer clip arm towards a second end of each of the first slot and the second slot.

In some implementations, according to any one of the preceding implementations, the gap includes a central portion that extends into two channels, and each of the two channels are configured to receive one of the first inner clip arm and the second inner clip arm. In some implementations, a method for fastening a mounting device configured to retain a component for a high-temperature process is provided. The mounting device has a first part having a first tab and a second part having a second tab. The first tab has a first slot and the second tab has a second slot. The method includes situating the component within a cavity of the mounting device, placing an outer clip within the first slot and the second slot, and pushing an inner clip within a gap of the outer clip such that the inner clip pushes the outer clip against each of a first end of the first slot, a second end of the first slot, a first end of the second slot, and a second end of the second slot.

In some implementations, according to any one of the preceding implementations, further including disassociating the outer clip and the inner clip from the mounting device after completion of the high-temperature process.

In some implementations, according to any one of the preceding implementations, the outer clip has an outer clip arm and the inner clip has an inner clip arm. A length of the outer clip arm is greater than a length of the inner clip arm.

In some implementations, according to any one of the preceding implementations, the outer clip arm faces a first direction and the inner clip arm faces a second direction. The second direction is opposite the first direction.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It will be understood that certain features and subcombinations are of utility and may be employed without reference to other features and subcombinations. Not all steps listed in the various figures need be carried out in the specific order described.

The invention claimed is:

1. A system for retaining a component that is to undergo a high-temperature process, the system comprising:
   a mounting tool having a first portion and a second portion, the first portion including a first tab with a first slot and the second portion including a second tab with a second slot, the first tab and the second tab usable to secure the first portion to the second portion while the component is retained within the mounting tool; and
   a fastening assembly, the fastening assembly including:
      an outer clip including outer clip arms and a central portion, the outer clip arms having a gap therebetween, the central portion protruding into the gap; and
      an inner clip separate from and not connected to the outer clip, the inner clip including inner clip arms, the inner clip configured to be pushed into the gap such that each inner clip arm contacts and pushes one outer clip arm outwardly towards the first tab and the second tab while the outer clip is retained within the first slot and the second slot;

wherein, the fastening assembly, when inserted into the first slot and the second slot, limits relative movement between the first tab and the second tab;

wherein, when the fastening assembly is inserted into the first slot and the second slot, the an entire inner clip is inboard each end of the first slot and each end of the second slot.

2. The system of claim 1, wherein the outer clip arms include a first outer clip arm and a second outer clip arm, each of the first outer clip arm and the second outer clip arm including a bowed section.

3. The system of claim 2, wherein the bowed section of the first outer clip arm curves in a first direction and the bowed section of the second outer clip arm curves in a second direction, the second direction being opposite the first direction.

4. The system of claim 3, wherein the inner clip arms include a first inner clip arm and a second inner clip arm, the first inner clip arm including a bowed portion corresponding to the bowed section of the first outer clip arm.

5. The system of claim 3, wherein the first outer clip arm is configured to contact one end of each of the first slot and the second slot, and the second outer clip arm is configured to contact an opposing end of each of the first slot and the second slot.

6. The system of claim 1, wherein:
each of the outer clip arms has an inner surface and an outer surface; and
each inner surface of each outer clip arm includes a recess.

7. The system of claim 1, wherein the gap includes a central portion and two channels, each of the two channels configured to accept one of the inner clip arms.

8. The system of claim 7, wherein each of the two channels includes a rounded end spaced apart from an associated inner clip arm.

9. The system of claim 1, further including a window in at least one of the outer clip and the inner clip.

10. The system of claim 1, wherein the fastening assembly is reusable.

11. The system of claim 1, wherein each of the outer clip arms extends from a curved shoulder.

12. The system of claim 1, wherein each of the outer clip arms expands during the high-temperature process in an outboard direction to push against the first tab and the second tab with an increased force relative to a force exerted by the outer clip arms in the outboard direction prior to the high-temperature process.

13. The system of claim 1, wherein the component is an aviation component.

14. The system of claim 1, wherein the component is selected from the group consisting of a turbine blade, a turbine vane, a compressor blade, and a compressor vane.

15. The system of claim 1, further comprising the component retained by the mounting tool.

16. A system for retaining a component that is to undergo a high-temperature process, the system comprising:
a mounting tool having a first portion and a second portion, the first portion including a first tab with a first slot and the second portion including a second tab with a second slot, the first tab and the second tab usable to secure the first portion to the second portion while the component is retained within the mounting tool;
a fastening assembly, comprising:
an outer clip including a first outer clip arm having a first bowed section, a second outer clip arm having a second bowed section, and a central portion, the first outer clip arm and the second outer clip arm having a gap therebetween, the central portion protruding into the gap; and
an inner clip separate from and not connected to the outer clip, the inner clip including inner clip arms, the inner clip configured to be pushed into the gap such that each inner clip arm contacts and pushes one outer clip arm towards the first tab and the second tab while the outer clip is retained within the first slot and the second slot;
wherein:
the fastening assembly, when inserted into the first slot and the second slot, limits relative movement between the first tab and the second tab; and
when the fastening assembly is inserted into the first slot and the second slot, an entire inner clip is inboard each end of the first slot and each end of the second slot.

17. The system of claim 16, wherein the inner clip arms include a first inner clip arm and a second inner clip arm, the first inner clip arm including a bowed portion corresponding to the first bowed section.

18. The system of claim 16, wherein the first outer clip arm contacts one end of each of the first slot and the second slot, and the second outer clip arm contacts an opposing end of each of the first slot and the second slot.

19. The system of claim 16, wherein:
each of the first outer clip arm and the second outer clip arm has an inner surface and an outer surface;
each inner surface of each outer clip arm includes a recess;
the gap includes a central portion and two channels, each of the two channels configured to accept one of the inner clip arms;
each of the two channels includes a rounded end spaced apart from an associated inner clip arm.

20. The system of claim 16, further comprising the component retained by the mounting tool.

* * * * *